(12) United States Patent
Yang et al.

(10) Patent No.: US 12,403,654 B2
(45) Date of Patent: *Sep. 2, 2025

(54) SYSTEMS AND METHODS FOR ADDITIVE MANUFACTURING

(71) Applicant: General Electric Company, Schenectady, NY (US)

(72) Inventors: Xi Yang, Mason, OH (US); Christopher David Barnhill, Cincinnati, OH (US); Trent William Muhlenkamp, Cincinnati, OH (US); Joseph Edward Hampshire, West Chester, OH (US)

(73) Assignee: General Electric Company, Evendale, OH (US)

( * ) Notice: Subject to any disclaimer, the term of this patent is extended or adjusted under 35 U.S.C. 154(b) by 197 days.

This patent is subject to a terminal disclaimer.

(21) Appl. No.: 18/065,862

(22) Filed: Dec. 14, 2022

(65) Prior Publication Data
US 2024/0109250 A1 Apr. 4, 2024

Related U.S. Application Data

(60) Provisional application No. 63/411,881, filed on Sep. 30, 2022.

(51) Int. Cl.
B29C 64/223 (2017.01)
B29C 64/232 (2017.01)
(Continued)

(52) U.S. Cl.
CPC .......... *B29C 64/223* (2017.08); *B29C 64/232* (2017.08); *B29C 64/236* (2017.08);
(Continued)

(58) Field of Classification Search
CPC ................ B29C 64/124; B29C 64/129; B29C 64/135; B29C 64/223; B29C 64/232; B29C 64/236
See application file for complete search history.

(56) References Cited

U.S. PATENT DOCUMENTS 1,990,749 A  2/1935  Phillips et al.
2,259,517 A  10/1941 Drenkard, Jr.
(Continued)

FOREIGN PATENT DOCUMENTS

CN  101628477 A  1/2010
CN  103210344 A  7/2013
(Continued)

OTHER PUBLICATIONS

Admatec, Admaflex 300 DLP 3D Printer, Admatec Europe, 2 Pages. Retrieved from Webpage: https://admateceurope.com/files/10fla369c2239943e6506f27ba920bd4dd9359078e744369695ab6ffbde75c6c?filename=Admaflex%20300%20brochure.pdf&sig=hOvDlzxkSmFOZwjM.
(Continued)

*Primary Examiner* — Atul P. Khare
(74) *Attorney, Agent, or Firm* — Dinsmore & Shohl LLP

(57) ABSTRACT

An additive manufacturing apparatus includes a support configured to support a resin and a constituent material. A support plate includes a window. A stage is configured to hold one or more composite layers of the resin and the constituent material to form a composite component positioned opposite the support plate. A radiant energy device is positioned on an opposite side of the support from the stage and is operable to generate and project radiant energy in a patterned image through the window. An actuator assembly is configured to move the stage in a Z-axis direction and a Y-axis direction.

15 Claims, 19 Drawing Sheets

(51) Int. Cl.
*B29C 64/236* (2017.01)
*B29C 64/245* (2017.01)
*B29C 64/264* (2017.01)
*B29C 64/336* (2017.01)
*B33Y 10/00* (2015.01)
*B33Y 30/00* (2015.01)
*B33Y 70/10* (2020.01)

(52) U.S. Cl.
CPC .......... *B29C 64/245* (2017.08); *B29C 64/264* (2017.08); *B29C 64/336* (2017.08); *B33Y 10/00* (2014.12); *B33Y 30/00* (2014.12); *B33Y 70/10* (2020.01)

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,143,819 A | 9/1992 | Mirle et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,863,486 A | 1/1999 | Ozaki et al. |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |

(56) References Cited

U.S. PATENT DOCUMENTS

| | | |
|---|---|---|
| 7,575,682 B2 | 8/2009 | Olsta et al. |
| 7,578,958 B2 | 8/2009 | Patel et al. |
| 7,601,289 B2 | 10/2009 | Hamano et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,658,778 B2 | 2/2010 | Pope et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,029,642 B2 | 10/2011 | Hagman |
| 8,048,261 B2 | 11/2011 | McCowin |
| 8,070,473 B2 | 12/2011 | Kozlak |
| 8,071,055 B2 | 12/2011 | Newcombe |
| 8,096,262 B2 | 1/2012 | Ederer et al. |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik et al. |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,737,862 B2 | 5/2014 | Manico et al. |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 9/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,905,739 B2 * | 12/2014 | Vermeer ............... B29C 64/129 264/494 |
| 8,915,728 B2 | 12/2014 | Mironets et al. |
| 8,926,304 B1 | 1/2015 | Chen |
| 8,932,511 B2 | 1/2015 | Napendensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kiesser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,527,272 B2 | 12/2016 | Steele |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |

(56) References Cited

U.S. PATENT DOCUMENTS

| | | |
|---|---|---|
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscyzn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,350,910 B2 | 7/2019 | Miwa et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 11,104,066 B2 * | 8/2021 | Dubelman ............. B33Y 80/00 |
| 11,433,617 B2 * | 9/2022 | Dubelman ............. B33Y 30/00 |
| 11,559,938 B2 * | 1/2023 | Boehm ................. B29C 64/223 |
| 11,707,883 B2 * | 7/2023 | Dubelman ............. B29C 64/124 |
| | | 264/308 |
| 11,794,412 B2 * | 10/2023 | Dubelman ............. B29C 64/393 |
| 2002/0164069 A1 | 11/2002 | Nagano et al. |
| 2003/0180171 A1 | 9/2003 | Artz et al. |
| 2003/0209836 A1 | 11/2003 | Sherwood |
| 2005/0012239 A1 | 1/2005 | Nakashima |
| 2005/0019016 A1 | 1/2005 | Nakashika et al. |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0224352 A1 | 9/2008 | Narukawa et al. |
| 2008/0241404 A1 | 10/2008 | Allaman et al. |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0138223 A1 | 6/2012 | Fang et al. |
| 2012/0195994 A1 | 8/2012 | El-Siblani et al. |
| 2012/0292800 A1 | 11/2012 | Higuchi et al. |
| 2013/0008879 A1 | 1/2013 | Bichsel |
| 2013/0140741 A1 | 6/2013 | El-Siblani et al. |
| 2014/0099476 A1 | 4/2014 | Subramanian et al. |
| 2014/0103581 A1 | 4/2014 | Das et al. |
| 2014/0200865 A1 | 7/2014 | Lehmann et al. |
| 2014/0239554 A1 | 8/2014 | El-Siblani |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeDimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |

(56) References Cited

U.S. PATENT DOCUMENTS

| | | |
|---|---|---|
| 2016/0214327 A1 | 7/2016 | Ucklemann et al. |
| 2016/0221262 A1 | 8/2016 | Das et al. |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157244 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126535 A1* | 5/2019 | Thompson ............. B33Y 30/00 |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0344381 A1 | 11/2019 | Pomerantz et al. |
| 2019/0389137 A1 | 12/2019 | Frohnmaier et al. |
| 2020/0001398 A1 | 1/2020 | Mellor et al. |
| 2020/0079008 A1 | 3/2020 | Chowdry et al. |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0197138 A1 | 6/2020 | Parkar et al. |
| 2020/0198224 A1 | 6/2020 | Dubelman et al. |
| 2020/0230938 A1 | 7/2020 | Menchik et al. |
| 2020/0247040 A1 | 8/2020 | Green |
| 2020/0290275 A1 | 9/2020 | Dubelman et al. |
| 2020/0307075 A1 | 10/2020 | Mattes et al. |
| 2020/0376775 A1 | 12/2020 | Das et al. |
| 2021/0046695 A1 | 2/2021 | Thompson et al. |
| 2021/0276248 A1 | 9/2021 | Boehm et al. |
| 2022/0213245 A1 | 7/2022 | Snow et al. |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| CN | 111674037 A * | 9/2020 |
| DE | 102007010624 A1 | 9/2008 |
| DE | 102013221385 A1 | 4/2015 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO01003901 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsys.com/.

(56) References Cited

OTHER PUBLICATIONS

Designing Buildings Wiki, Types of Brick Bonding, 6 Pages. Retrieved Mar. 25, 2021 from Webpage: https://www.designingbuildings.co.uk/wiki/Types_of_brick_bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics 2018.02.006.

Kudo3d, Post-Process Your SLA Prints in 4 Easy Steps, 8 Pages. Retrieved from Webpage: https://www.kudo3d.com/post-process-your-sla-prints-in-4-easy-steps/.

Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing technology.

Lee et al., Development of a 3D Printer Using Scanning Projection Stereolithography, Scientific Reports, vol. 5, Article No. 9875, 2015, 5 pages. https://www.nature.com/articles/srep09875#s1.

Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.

Limaye, Multi-Objective Process Planning Method for Mask Projection Stereolithography, Dissertation Georgia Institute of Technology, Dec. 2007, 324 Pages.

Lithoz, 2 Pages. Retrieved from Webpage: http://www.lithoz.com/en/our-products/cleaning-station.

Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.

Micron3D, Cleaning of Printed Models, YouTube, Dec. 5, 2016, 1 Page. Retrieved from Webpage: https://www.youtube.com/watch?v=soAIrSs1iBY.

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa Florida.

Omegasonics, Ultrasonic Cleaning of 3D Printer Parts, YouTube, Feb. 26, 2014, 1 Page. Retrieved from Webpage: https://www.youtube.com/watch?v=Gxj47OS5ohk.

Park et al., Development of Multi-Material DLP 3D Printer, Journal of the Korean Society of Manufacturing Technology Engineers, vol. 26, Issue 1, 2017, pp. 100-107. https://doi.org/10.7735/ksmte.2017.26.1.100.

Prodways Tech, Prodways Movinglight Technology Retrieved on Jul. 2, 2020 from Web Link: https://www.prodways.com/en/the-prodways-movinglight-technology/.

Ramco Equipment Corporation, Ramco RamTough-Fully Automated Wash/Rinse/Dry System, YouTube, Jul. 9, 2013, 1 Page. Retrieved from Webpage: htpps://www.youtube.com/watch?y=i8S5Oc3FVFU.

Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.

Sonics & Materials, Inc., Ultrasonic Food Cutting Equipment, Sonics & Materials, Inc., Retrieved on Jun. 26, 2020, 4 Pages. https://www.sonics.com/food-cutting.

Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.

Stevenson, Admatec's Ceramic 3D Printers, Ceramic Metal, Fabbaloo, Jan. 21, 2019,8 Pages. Retrieved from Webpage: https://www.fabbaloo.com/blog/2019/1/21/admatecs-ceramic-3d-printers.

Techmetals, Engineered Metal Finishing & Performance Coating, Electroless Nickel (TM 117C), 1 Page. Retrieved from Webpage: https://techmetals.com/pdfs/TM_117C.pdf https://techmetals.com/tm117c-2/.

Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.

Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.

Tok et al., Tape Casting of High Dielectric Ceramic Substrates for Microelectronics Packaging, Journal of Materials Engineering and Performance, vol. 8, 1999, pp. 469-472. (Abstract Only) http://link.springer.com/article/10.1361/105994999770346783.

Wikipedia, Pixel Shifting, 2 Pages. Retrieved Mar. 30, 2021 from Webpage: https:/en.wikipedia.org/wiki/Pixel_shifting.

Wikipedia, Standing Wave, 11 Pages. Retrieved Mar. 17, 2021 from Webpage: https://en.wikipedia.org/wiki/Standing_wave.

\* cited by examiner

SYSTEMS AND METHODS FOR ADDITIVE MANUFACTURING

CROSS-REFERENCE TO RELATED APPLICATION

The present application claims priority to U.S. Provisional Patent Application Ser. No. 63/411,881, filed on Sep. 30, 2022, the contents of which are hereby incorporated by reference in their entirety.

FIELD

The present subject matter relates generally to an additive manufacturing apparatus, and more particularly to an additive manufacturing apparatus that can form multi-material components.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously cured layer.

In some instances, additive manufacturing may be accomplished through a "tape casting" process. In this process, a resin is deposited onto a flexible radiotransparent support, such as a tape or foil, that is fed out from a supply reel to a build zone. Radiant energy is produced from a radiant energy device and directed through a window to cure the resin to a component that is supported by a stage in the build zone. Once the curing of the first layer is complete, the stage and the support are separated from one another. The support is then advanced and fresh resin is provided to the build zone. In turn, the first layer of the cured resin is placed onto the fresh resin and cured through the energy device to form an additional layer of the component. Subsequent layers are added to each previous layer until the component is completed. The tape casting process may be used to form various components.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1A:
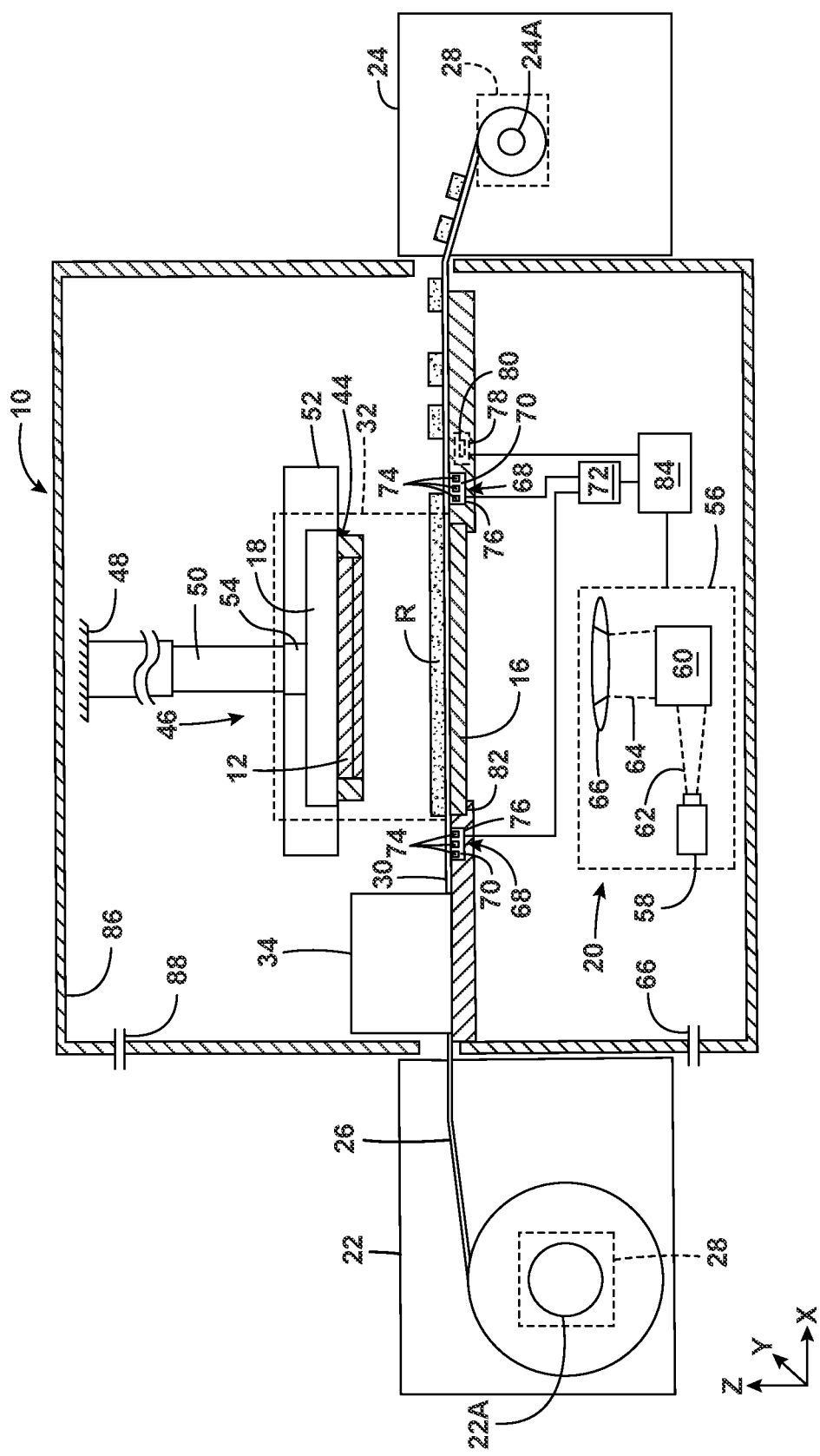
FIG. 1A is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a support movement along the manufacturing apparatus. For example, "upstream" refers to the direction from which the support moves, and "downstream" refers to the direction to which the support moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus can further include a resin and a constituent material that are each deposited as layers having a desired thickness onto a support (such as a foil, tape, vat, plate, etc.). In various instances, the resin may be laterally offset from the constituent material in a Y-axis direction. In various examples, the constituent material M may be in the form of any material, that may be used to at least partially form the component that is remote from the resin prior to formation of a layer of the component. In various examples, the constituent material M may be configured as a short fiber (e.g., chopped fibers), metallic powders, carbon-based powders, ceramic powders (e.g., silicon carbide (SiC), aluminum oxide (Al2O3), silicon dioxide (SiO2), other oxides, carbides, nitrides, borides, and/or annoy other material), polymeric powders, and/or any other practicable constituent material that may be interspersed with the resin to form a composite component.

A stage can be configured to hold first and second composite layers of the resin and the constituent material to form a composite component positioned opposite the support plate. In some cases, the constituent material can extend between the first and second composite layers.

In some cases, the additive manufacturing apparatus can produce short fiber (or other material) reinforced composites having greater than a ten percent by volume loading. Additionally or alternatively, the additive manufacturing apparatus can produce multi-material and multi-particle sizes parts, with common or varied densities throughout various portions of the component.

Figure 1B:
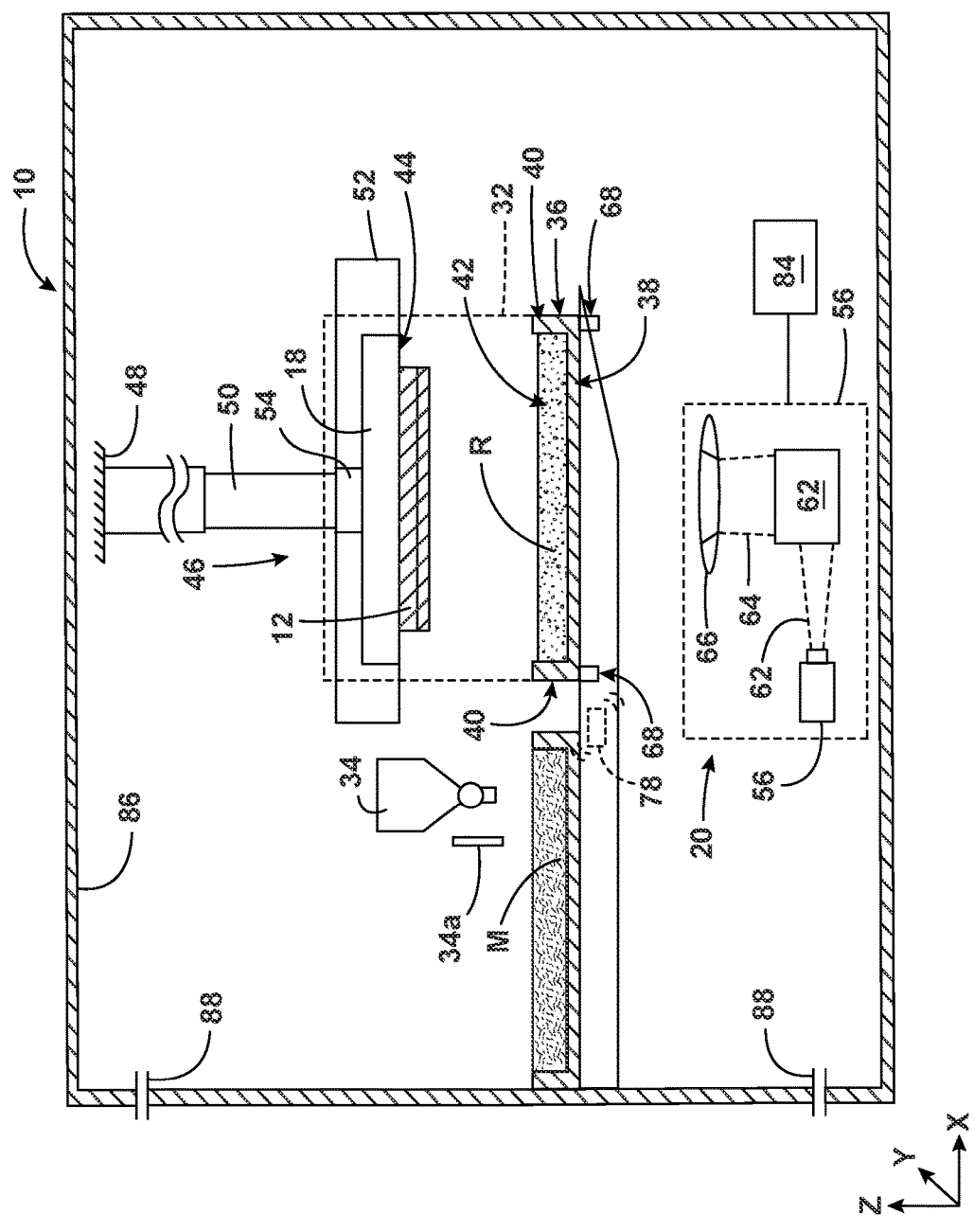
FIG. 1B is a schematic side view of an additive manufacturing apparatus in accordance with various aspects of the present disclosure.

Referring to the drawings wherein identical reference numerals denote the similar elements throughout the various views, FIGS. 1A and 1B schematically illustrate various examples of apparatuses 10 for forming a component 12 created through one or more layers of at least one cured resin R and/or any other constituent material M. The apparatus 10 can include one or more of a support plate 14, a window 16, a stage 18 that is movable relative to the window 16, and a radiant energy device 20, which, in combination, may be used to form any number (e.g., one or more) of additively manufactured components 12.

In the illustrated example of FIG. 1A, the apparatus 10 includes a feed module 22, which may include a first roller 22A, and a take-up module 24, which may include a second roller 24A, that are spaced-apart with a support 26 extending therebetween. A portion of the support 26 can be supported from underneath by the support plate 14. Suitable mechanical supports (frames, brackets, etc.) and/or alignment devices may be provided for the rollers 22A, 24A and the support plate 14. The first roller 22A and/or the second roller 24A can be configured to control the speed and direction of the support 26 such that the desired tension and speed are maintained in the support 26 through a drive system 28. By way of example and not limitation, the drive system 28 can be configured as individual motors associated with the first roller 22A and/or the second roller 24A. Moreover, various components, such as motors, actuators, feedback sensors, and/or controls can be provided for driving the rollers 22A, 24A in such a manner to maintain the support 26 tensioned between the aligned rollers 22A, 24A and to wind the support 26 from the first roller 22A to the second roller 24A.

In various embodiments, the window 16 is transparent and can be operably supported by the support plate 14. Further, the window 16 and the support plate 14 can be integrally formed such that one or more windows 16 are integrated within the support plate 14. Likewise, the support 26 is also transparent or includes portions that are transparent. As used herein, the terms "transparent" and "radiotransparent" refer to a material that allows at least a portion of radiant energy of a selected wavelength to pass through. For example, the radiant energy that passes through the window 16 and the support 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The support 26 extends between the feed module 22 and the take-up module 24 and defines a "build surface" 30, which is shown as being planar, but could alternatively be arcuate (depending on the shape of the support plate 14). In some instances, the build surface 30 may be defined by the support 26 and be positioned to face the stage 18 with the window 16 on an opposing side of the support 26 from the stage 18. For purposes of convenient description, the build surface 30 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the support 26. As used herein, the Y-axis refers to the transverse direction across the width of the support 26 and generally perpendicular to the machine direction. As used herein, the Z-axis refers to the stage direction that can be defined as the direction of movement of the stage 18 relative to the window 16.

The build surface 30 may be configured to be "non-stick," that is, resistant to the adhesion of a cured resin R. The non-stick properties may be embodied by a combination of variables such as the chemistry of the support 26, its surface finish, and/or applied coatings. For example, the support 26 may be formed from biaxially oriented polypropylene. Additionally or alternatively, a permanent or semi-permanent non-stick coating may be applied. One non-limiting example of a suitable coating is polytetrafluoroethylene ("PTFE"). In some examples, all or a portion of the build surface 30 may incorporate a controlled roughness or surface texture (e.g. protrusions, dimples, grooves, ridges, etc.) with nonstick properties. Additionally or alternatively, the support 26 may be made in whole or in part from an oxygen-permeable material.

For reference purposes, an area or volume immediately surrounding the location of the support 26 and the window 16 or transparent portion defined by the support plate 14 may be defined as a "build zone," labeled 32.

In some instances, a depositor 34 may be positioned along the support 26. The depositor 34 may be any device or combination of devices that is operable to dispose resin R and/or any other constituent material M on the support 26. The depositor 34 may optionally include a device or combination of devices to define a height of a resin R and/or any other constituent material M on the support 26 and/or to level the resin R and/or any other constituent material M on the support 26. Nonlimiting examples of suitable material deposition devices include chutes, rollers, hoppers, pumps, spray nozzles, spray bars, or printheads (e.g. inkjets). In some examples, a doctor blade may be used to control the thickness of and/or any other constituent material M applied to the support 26 as the support 26 passes the depositor 34.

In the illustrated example of FIG. 1B, the support 26 may be in the form of a vat 36 that is configured to isolate debris that could contaminate the build from usable resin R. The vat 36 may include a floor 38 and a perimeter wall 40. The perimeter wall 40 extends from the floor 38. Inner surfaces of the floor 38 and the perimeter wall 40 define a receptacle 42 for receiving the resin R and/or any other constituent material M. As illustrated, the additive manufacturing apparatus 10 can include a first vat 36 that may retain a resin R therein and a second vat 36 that may retain the constituent material M therein.

A drive system 28 (FIG. 1A) may be provided for moving the vat 36 relative to the stage 18 parallel to the X-direction between a build zone 32 and a position at least partially external to the build zone 32. However, it will be appreciated that, in other embodiments, the support 26 may be stationary without departing from the scope of the present disclosure.

Referring back to FIGS. 1A and 1B, the resin R includes any radiant-energy curable material, which is capable of adhering to or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photoinitiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity resin that will not "slump" or run off during the build process. The composition of the resin R may be selected as desired to suit a particular application. Mixtures of different compositions may be used. The resin R may be selected to have the ability to out-gas or burn off during further processing, such as a sintering process.

Additionally or alternatively, the resin R may be selected to be a viscosity-reducible composition. These compositions reduce in viscosity when a shear stress is applied or when they are heated. For example, the resin R may be selected to be shear-thinning such that the resin R exhibits reduced viscosity as an amount of stress applied to the resin R increases. Additionally or alternatively, the resin R may be selected to reduce in the viscosity as the resin R is heated.

The resin R may include a filler. The filler may be pre-mixed with resin R, then loaded into the depositor 34. Alternatively, the filler may be mixed with the resin R on the apparatus 10. The filler may include any material that is chemically and physically compatible with the selected resin R. The particles may be regular or irregular in shape, may be uniform or non-uniform in size, and may have variable aspect ratios. For example, the particles may take the form of powder, small spheres, or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon application of sufficient energy. For example, fusibility is a characteristic of many available powders including but not limited to polymeric, ceramic, glass, and metallic. The proportion of filler to resin R may be selected to suit a particular application. Generally, any amount of filler may be used so long as the combined material is capable of flowing and being leveled, and there is sufficient resin R to hold together the particles of the filler in the cured state.

Additionally, the constituent material M may be in the form of a solid material, such as a short fiber (e.g., chopped fibers), metallic powders, carbon-based powders, ceramic powders (e.g., silicon carbide (SiC), aluminum oxide ($Al_2O_3$), silicon dioxide ($SiO2$)), polymeric powders, and/or any other practicable constituent material. As used herein, the term "powder" is defined as a substance comprised of ground, pulverized, or otherwise dispersed solid particles. In some cases, the constituent material M may have a particle size in the longest direction from about 1 to about 1000 μm to form printed hybrid components 12 with a higher green density. In certain other embodiments, the powder may have a particle size in the longest dimension from about 5 microns to about 40 microns. The particle shape of the powder may be spherical, ellipsoidal, or irregular. In any manner, the constituent material M may be any material that may be interspersed with the resin R to form a composite component 12.

The stage 18 is a structure defining a planar surface 44, which is capable of being oriented parallel to the build surface 30 or the X-Y plane. Various devices may be provided for moving the stage 18 relative to the window 16. For example, as illustrated in FIGS. 1A and 1B, the movement may be provided through an actuator assembly 46 that may be coupled with a static support 48. In some embodiments, the actuator assembly 46 may include a first actuator 50 between the stage 18 and the static support 48 that allows for movement of the stage 18 in a first, vertical direction (e.g., along the Z-axis direction). The actuator assembly 46 may additionally or alternatively include a second actuator 52 between the stage 18 and the first actuator 50 and/or the static support 48 that allows for movement in the X-axis direction and/or the Y-axis direction. The actuator assembly 46 may additionally or alternatively include a third actuator 54 between the stage 18 and the second actuator 52 and/or the stage 18 that allows for movement in the X-axis direction and/or the Y-axis direction. The actuator assembly 46 may include any device practicable for moving the stage 18 in any direction, such as ballscrew electric actuators, linear electric actuators, pneumatic cylinders, hydraulic cylinders, delta drives, belt systems, or any other practicable device. It will be appreciated that, in other examples, the support may additionally or alternatively translate in the Y-axis direction (or any other direction).

The radiant energy device 20 may be configured as any device or combination of devices operable to generate and project radiant energy at the resin R in a suitable pattern and with a suitable energy level and other operating characteristics to cure the resin R during the build process. For example, as shown in FIGS. 1A and 1B, the radiant energy device 20 may include a projector 56, which may generally refer to any device operable to generate a radiant energy predetermined patterned image of suitable energy level and other operating characteristics to cure the resin R. As used herein, the term "patterned image" refers to a projection of radiant energy comprising an array of one or more individual pixels. Non-limiting examples of patterned image devices include a DLP projector or another digital micromirror device, a two-dimensional array of LEDs, a two-dimensional array of lasers, and/or optically addressed light valves. In the illustrated example, the projector 56 includes a radiant energy source 58 such as a UV lamp, an image forming apparatus 60 operable to receive a source beam 62 from the radiant energy source 58 and generate a patterned image 64 to be projected onto the surface of the resin R, and optionally focusing optics 66, such as one or more lenses.

The image forming apparatus 60 may include one or more mirrors, prisms, and/or lenses and is provided with suitable actuators, and arranged so that the source beam 62 from the radiant energy source 58 can be transformed into a pixelated image 64 in an X-Y plane coincident with the surface of the resin R. In the illustrated example, the image forming apparatus 60 may be a digital micro-mirror device.

The projector 56 may incorporate additional components, such as actuators, mirrors, etc. configured to selectively move the image forming apparatus 60 or other part of the projector 56 with the effect of rastering or shifting the location of the patterned image 64 on the build surface 30. Stated another way, the patterned image 64 may be moved away from a nominal or starting location.

In addition to other types of radiant energy devices 20, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 58 and a beam steering apparatus. The radiant energy source 58 may include any device operable to generate a beam of suitable power and other operating characteristics to cure the resin R. Non-limiting examples of suitable radiant energy sources 58 include lasers or electron beam guns.

In some instances, the apparatus 10 may include a retention assembly 68 that may be configured to retain the support 26 in a predefined position along the support plate 14. In some instances, the retention assembly 68 can include one or more pneumatic actuation zones 70 with each pneumatic actuation zone 70 configured to selectively interact with the support 26 by producing a force on a surface of the support 26 opposite the resin R.

The one or more pneumatic actuation zones 70 may apply a negative pressure on a first surface of the support 26 that is opposite to the resin R, or a second side of the support 26, to produce a suction or vacuum on the support 26. The negative pressure may retain the support 26 in a desired position along the support plate 14. The one or more pneumatic actuation zones 70 may also apply a positive pressure on the first surface of the support 26 that is opposite to the resin R, or a second side of the support 26, to produce a pushing force on the support 26. The positive pressure may release the support 26 from a component of the apparatus 10, such as the window 16, the retention assembly 68, etc. As used herein, a "negative" pressure is any pressure that is less than an ambient pressure proximate to one or more pneumatic actuation zones 70 such that fluid may be drawn into the one or more pneumatic actuation zones 70. Conversely, a "positive" pressure is any pressure that is greater than an ambient pressure proximate to one or more pneumatic actuation zones 70 such that fluid may be exhausted from the one or more pneumatic actuation zones 70. Further, a "neutral" pressure is any pressure that is generally equal to an ambient pressure proximate to one or more pneumatic actuation zones 70.

In some examples, the pneumatic actuation zones 70 may be fluidly coupled with a pneumatic assembly 72 through various hoses and one or more ports. The pneumatic assembly 72 may include any device capable of providing a vacuum/suction and/or pushing a fluid, such as air or a process gas (e.g., nitrogen or argon), through the one or more pneumatic actuation zones 70. For instance, the pneumatic assembly 72 may include a pressurized fluid source that includes a compressor and/or a blower. The pneumatic assembly 72 may additionally or alternatively include any assembly capable of altering a pressure, such as a venturi vacuum pump. In some embodiments, one or more valves and/or switches may be coupled with the pneumatic assembly 72 and the one or more pneumatic actuation zones 70. The one or more valves and/or switches are configured to regulate a pressure to each of the one or more pneumatic actuation zones 70.

In some embodiments, the pneumatic actuation zone 70 includes one or more apertures 74 of any size and shape for interacting with the support 26. For instance, the apertures 74 may be any number and combination of holes, slits, or other geometric shapes defined by any component of the additive manufacturing apparatus 10, such as a portion of the support plate 14. Additionally, or alternatively, the apertures 74 may be defined by a portion of the support plate 14 being formed from a porous material, or through any other assembly in which a fluid may be moved from a first side of the support plate 14 to a second side of the support plate 14 to interact with the support 26.

In some examples, the pneumatic actuation zone 70 may be defined by a plenum 76. The plenum 76 may be of any size and may be similar or varied from the shape of any remaining plenum 76. In some instances, a gasket may be positioned about a rim of the plenum 76. Additionally or alternatively, the retention assembly 68 may include one or more clamps that compressively maintain the support 26 along the support plate 14.

With further reference to FIGS. 1A and 1B, a movement assembly 78 may be integrated within the support plate 14 and/or otherwise operably coupled with the support 26. The movement assembly 78 may be configured to apply a shearing stress to the resin R to alter (e.g., reduce) a viscosity of the resin R. Additionally or alternatively, the movement assembly 78 may be configured to heat the resin R to alter the viscosity of the resin R. It will be appreciated that in embodiments that heat the resin R to alter the viscosity of the resin R, the heat provided may be within a predefined range that is sufficient to alter the viscosity of the resin R without causing any cross-linking in the polymer. Additionally or alternatively, the movement assembly 78 may level, alter a packing density, and/or alter an orientation of any other constituent material M that may be positioned on the support 26.

In some embodiments, the movement assembly 78 may be configured to mechanically vibrate a portion of the support plate 14 to create a shearing stress on the resin R. For example, the movement assembly 78 may include a movement device 80 (e.g., a transducer) that is operably coupled with the support plate 14. The movement device 80 may be configured to vibrate at least a portion of the support plate 14 or any other module of the apparatus 10 that is then transferred to the resin R. Additionally and/or alternatively, the movement device 80 may be configured to convert electrical energy to ultrasonic mechanical pressure waves that are transferred to the resin R. For instance, the movement device 80 may be in the form of an ultrasonic vibrating device, such as one utilizing a piezoelectric transducer. In other embodiments, the movement assembly 78, in addition to or in lieu of the transducer, may include, alone or in conjunction with one or the other, a fluid, an acoustic, a motor (e.g., offset cam), a reciprocating piston, or any other movement device 80.

The movement device 80 may be operably coupled with a computing system 84. The computing system 84 may include a signal generator that supplies an electric impulse to the movement device 80, the voltage of which can be varied at different frequencies and with different waveshapes. The signal may, for example, be a pure sinusoidal wave or may be modulated with one or more other frequencies. Alternatively, the signal may be a stepped or spiked pulse. In some embodiments, the signal generator transmits a signal of between 20-80 kHz. For example, the signal is at about 60 kHz. The signal generator may, for example, transmit a constant amplitude signal at a constant frequency, or alternate one or both of these parameters. A power level can be selected as a percentage of maximum power.

In other embodiments, the movement assembly 78 may be configured to create a shearing stress on the resin R through other configurations without departing from the scope of the present disclosure. For example, the movement assembly 78 may be configured as a probe that may be adjacent and in physical contact with the support 26 and/or any other module that may relay the shearing stress to the resin R on the support 26. Additionally or alternatively, the movement assembly 78 may be configured as an ultrasonic or vibration plate that may be operably coupled with the support 26 and/or any other module of the apparatus 10 that may provide the shearing stress to the resin R on the support 26.

With further reference to FIGS. 1A and 1B, in various embodiments, a gasket 82 may be positioned between the window 16 and the support plate 14 to isolate movement of each of the window 16 and the support plate 14 from one another. By isolating movement of the window 16 from the support plate 14, degradation issues of the apparatus 10 caused through the operation of movement assembly 78 may be mitigated. In various examples, the gasket 82 may be formed from a motion attenuating material, such as any of a wide variety of resilient elastomers including, but not limited to, materials containing natural rubber and silicone.

As provided herein, in some instances, the movement assembly 78 may additionally or alternatively be capable of producing heat to alter the viscosity of the resin R. For example, fast heating processes, such as dielectric or microwave heating, can be used to avoid exposing the resin R to a long heating cycle before the temperature of use is reached.

The computing system 84 in FIGS. 1A and 1B is a generalized representation of the hardware and software that may be implemented to control the operation of the apparatus 10, including some or all of the stage 18, the drive system 28, the radiant energy device 20, the actuator assembly 46, the retention assembly 68, the movement assembly 78, a movement device 80, actuators, and the various parts of the apparatus 10 described herein. The computing system 84 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 86, which may be used to provide a shielding or inert gas (e.g., a "process gas") atmosphere using gas ports 88. Optionally, the pressure within the housing 86 could be maintained at a desired level greater than or less than atmospheric. Optionally, the housing 86 could be temperature and/or humidity controlled. Optionally, ventilation of the housing 86 could be controlled based on factors such as a time interval, temperature, humidity, and/or chemical species concentration. In some embodiments, the housing 86 can be maintained at a pressure that is different than an atmospheric pressure.

Referring now to FIGS. 2-13, various views of the additive manufacturing apparatus 10 are illustrated according to various aspects of the present disclosure. While only some components of the additive manufacturing apparatus are illustrated in FIGS. 2-13 for clarity purposes, it will be appreciated that the additive manufacturing apparatus may include any feature described in the present disclosure.

In the embodiments illustrated in FIGS. 2-13, the additive manufacturing apparatus may include a frame 126 and an actuator assembly 46 configured to allow for movement of various components of the additive manufacturing apparatus relative to one another. In some instances, the frame 126 may include a frame structure 128 and may be operably coupled with and/or operably support various components of the additive manufacturing apparatus. As illustrated, the frame 126 may support a build plate 130, a support plate 14, and/or a base plate 132.

The build plate 130 may support a first actuator 50. In some embodiments, the first actuator 50 can allow for movement of the stage 18 in a first, vertical direction (e.g., along the Z-axis direction). The first actuator 50 may include any device practicable for moving the stage 18 in the Z-axis direction, such as ballscrew electric actuators, linear electric actuators, pneumatic cylinders, hydraulic cylinders, delta drives, belt systems, or any other practicable device.

A print head 134 may be operably coupled with the first actuator 50. In such instances, the print head 134 may be configured to translate or otherwise through the actuation of the first actuator 50. The print head 134 may further be operably coupled with the stage 18. In some instances, the print head 134 may include a clamp 136 and/or any other feature for retaining the stage 18 on the print head 134.

The frame 126 may further be operably coupled with the support plate 14. In various embodiments, a window 16 can be operably supported by the support plate 14. Further, the window 16 and the support plate 14 can be integrally formed such that one or more windows 16 are integrated within the support plate 14.

With further reference to FIGS. 2-13, the base plate 132 may be fixed to a bottom portion of the frame structure 128. A first slide assembly 138 may be operably coupled with the base plate 132. The first slide assembly 138 may be configured to guide the movement of the base plate 132 relative to a mounting plate 140, which may be retained within a generally static position within the additive manufacturing apparatus 10. It will be appreciated, however, that the mounting plate 140 may be moveable.

In the embodiments illustrated in FIGS. 2-13, one or more guides 142 may be operably coupled with the base plate 132. The guides 142 may move along a track 144 operably coupled with the mounting plate 140. As will be described in greater detail below, the first slide assembly 138 may allow for the frame 126, and, consequently, the stage 18 to translate along the track 144 in the Y-axis direction such that the stage 18 may be lowered onto a resin R and/or a constituent material M (and/or a second resin). In some embodiments, the track 144 may be operably coupled with the base plate 132 and the guides 142 may be operably coupled with the mounting plate 140 without departing from the scope of the present disclosure. In addition, the first slide assembly 138 may include any components that allow for movement of the base plate 132 relative to the mounting plate 140 without departing from the teachings provided herein.

As provided herein, the resin R includes any radiant-energy curable material, which is capable of adhering to or binding together the filler (if used) in the cured state. Additionally, the constituent material M may be in the form of a short fiber (e.g., chopped fibers), metallic powders, carbon-based powders, ceramic powders (e.g., silicon carbide (SiC), aluminum oxide ($Al_2O_3$), silicon dioxide (SiO2)), polymeric powders, and/or any other practicable constituent material. As shown, the resin R may be separated from the constituent material M by a gap 124. As such, the stage 18 may be moved between the resin R and the constituent material M to form a composite component 12, which may be a short fiber reinforced composite having a 10 volume percent (or greater) fiber loading. Additionally or alternatively, the composite component 12 can have resin R and constituent material M of varied densities throughout the component 12. Additionally or alternatively, the composite component 12 can be formed from multiple materials, which may be of varied or common particle sizes.

In various embodiments, a second actuator 52 may be operably coupled with the base plate 132 and the mounting plate 140. The second actuator 52 may be configured to move the base plate 132 relative to the mounting plate 140 in the Y-axis direction. The second actuator 52 may include any practicable device, such as ballscrew electric actuators, linear electric actuators, pneumatic cylinders, hydraulic cylinders, delta drives, belt systems, or any other practicable device.

Referring still to FIGS. 2-13, in various embodiments, the radiant energy device 20 may be operably coupled with the frame 126 and positioned on an opposing side of the window from the stage 18 in the Z-direction. In the illustrated embodiments, the radiant energy device 20 may include a pair of projectors 56. However, it will be appreciated that the radiant energy device 20 may be configured as any device or combination of devices operable to generate and project radiant energy at the resin R in a suitable pattern and with a suitable energy level and other operating characteristics to cure the resin R during a build process.

In some embodiments, the radiant energy device 20 may be operably coupled with a carrier plate 146. In some instances, the radiant energy device 20 may include one or more carrier rails 148 that are coupled with the carrier plate 146 for retaining the radiant energy device 20 relative to the carrier plate 146.

In several embodiments, the radiant energy device 20 may be movably coupled with the frame 126. For example, a second slide assembly 150 may be positioned between the carrier plate 146 and the base plate 132. The second slide assembly 150 may be configured to guide the movement of the carrier plate 146 relative to the base plate 132. As such, in some examples, the stage 18 and the radiant energy device 20 may move in conjunction relative to the mounting panel with one another through the use of the first slide assembly 138 and the radiant energy device 20 may move relative to the stage 18 through use of the second slide assembly 150.

In the embodiments illustrated in FIGS. 2-13, one or more guides 152 may be operably coupled with the carrier plate 146. The guides 152 may move along a rail 154 operably coupled with the base plate 132. In some cases, the second slide assembly 150 may allow for the radiant energy device 20 to translate along the second slide assembly 150 in the Y-axis direction such that the radiant energy device 20 may be aligned with various portions of the support 26. It will be appreciated that in other embodiments, the rail 154 may be operably coupled with the carrier plate 146 and the guides 152 may be operably coupled with the base plate 132 without departing from the scope of the present disclosure. In addition, it will be appreciated that the second slide assembly 150 may be operably coupled with any other component, such as the frame 126 or the mounting plate 140 without departing from the teachings provided herein.

In various embodiments, a third actuator 54 may be operably coupled with the carrier plate 146 and the base plate 132. The third actuator 54 may be configured to move the carrier plate 146 relative to the base plate 132 in the Y-axis direction. The third actuator 54 may include any practicable device, such as ballscrew electric actuators, linear electric actuators, pneumatic cylinders, hydraulic cylinders, delta drives, belt systems, or any other practicable device.

Figure 2:
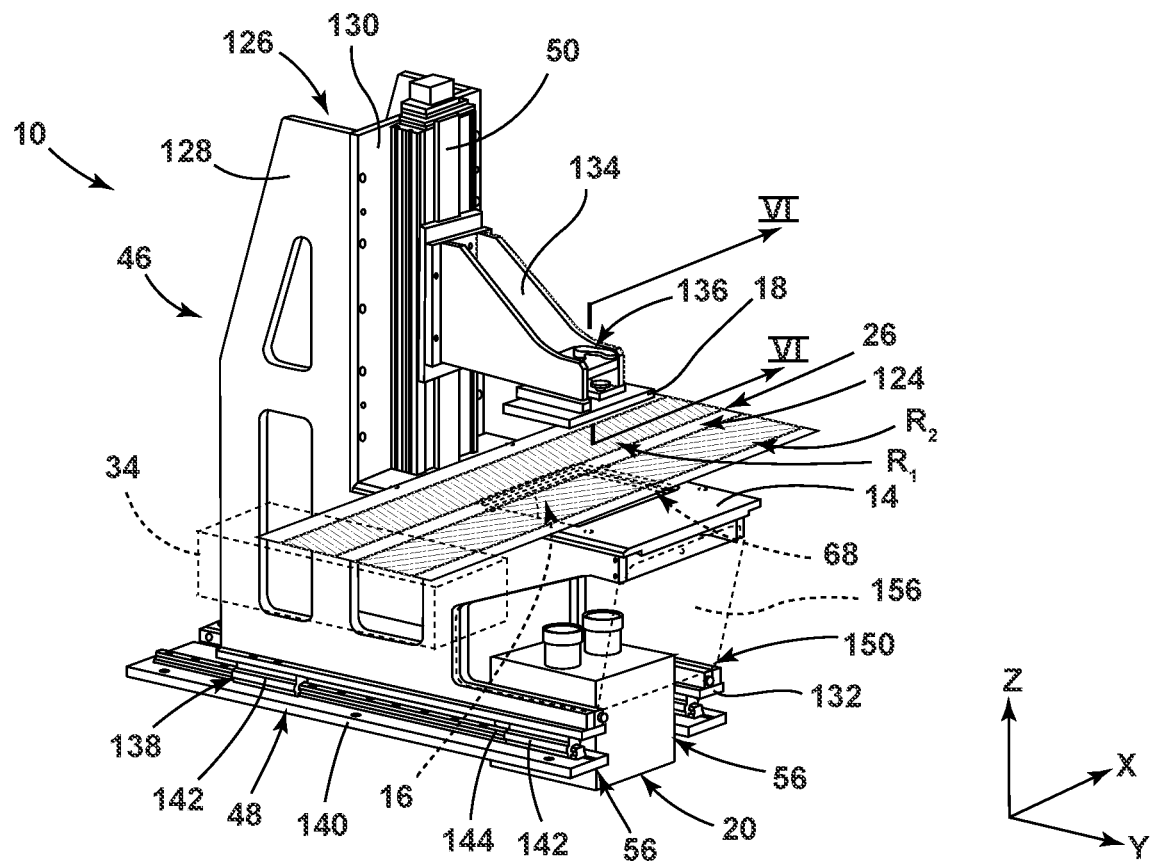
FIG. 2 is a side perspective view of the additive manufacturing apparatus in accordance with various aspects of the present disclosure.
Figure 3:
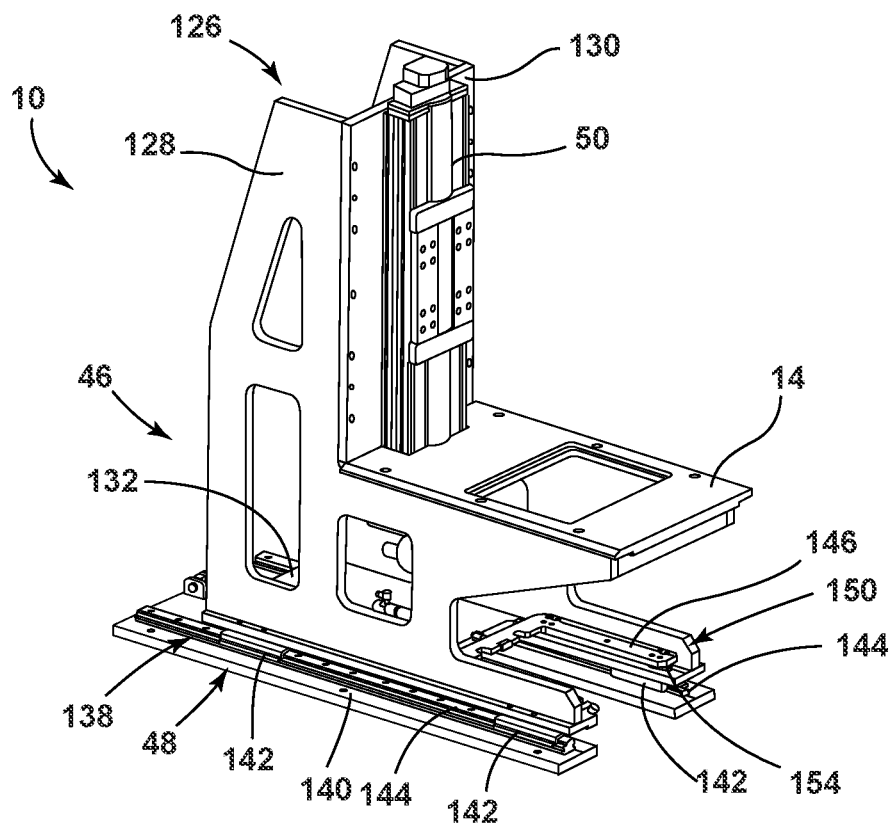
FIG. 3 is a side perspective view of a frame of the additive manufacturing apparatus in accordance with various aspects of the present disclosure.
Figure 4:
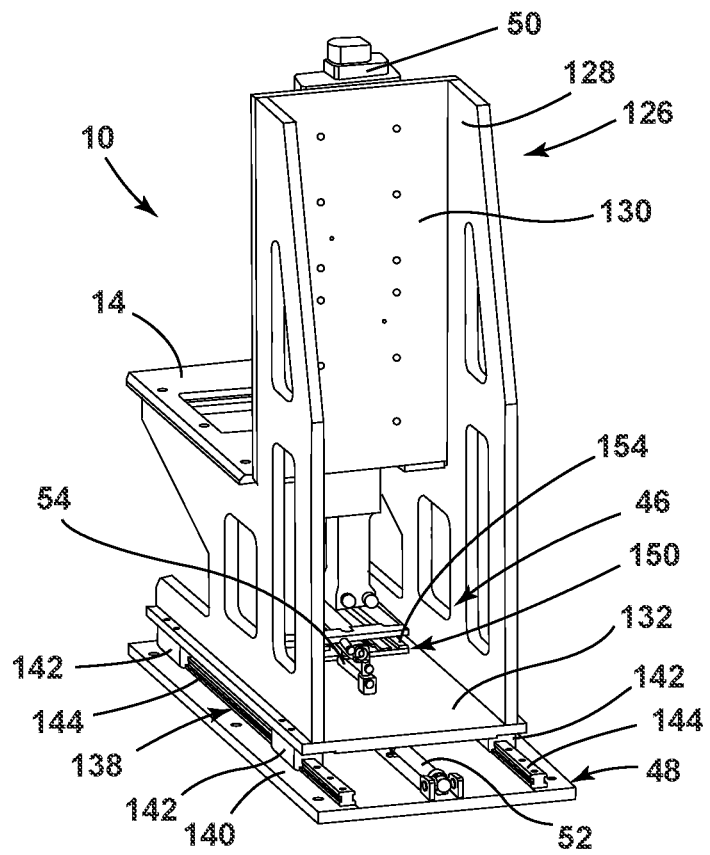
FIG. 4 is a rear perspective view of a frame of the additive manufacturing apparatus in accordance with various aspects of the present disclosure.

As illustrated in FIG. 2, a cover 156 may be operably coupled with the frame 126 and configured to shield an area between the lenses of the radiant energy device 20 and the support plate 14. In various embodiments, the shield may be configured to prevent light within various spectrums and/or all light from passing therethrough.

Figure 5:
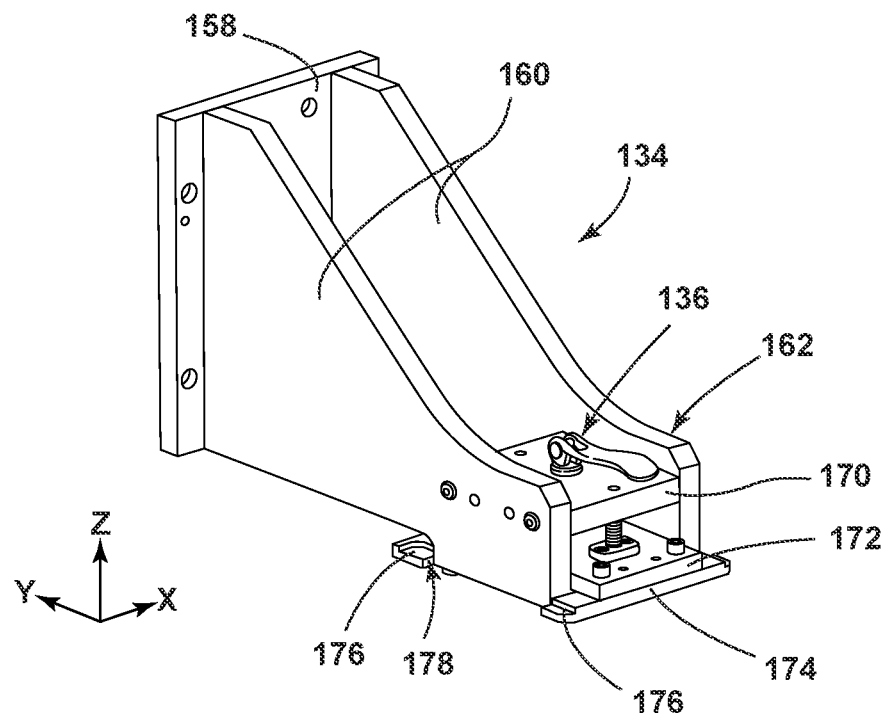
FIG. 5 is a side perspective view of a print head of the additive manufacturing apparatus in accordance with various aspects of the present disclosure.
Figure 6:
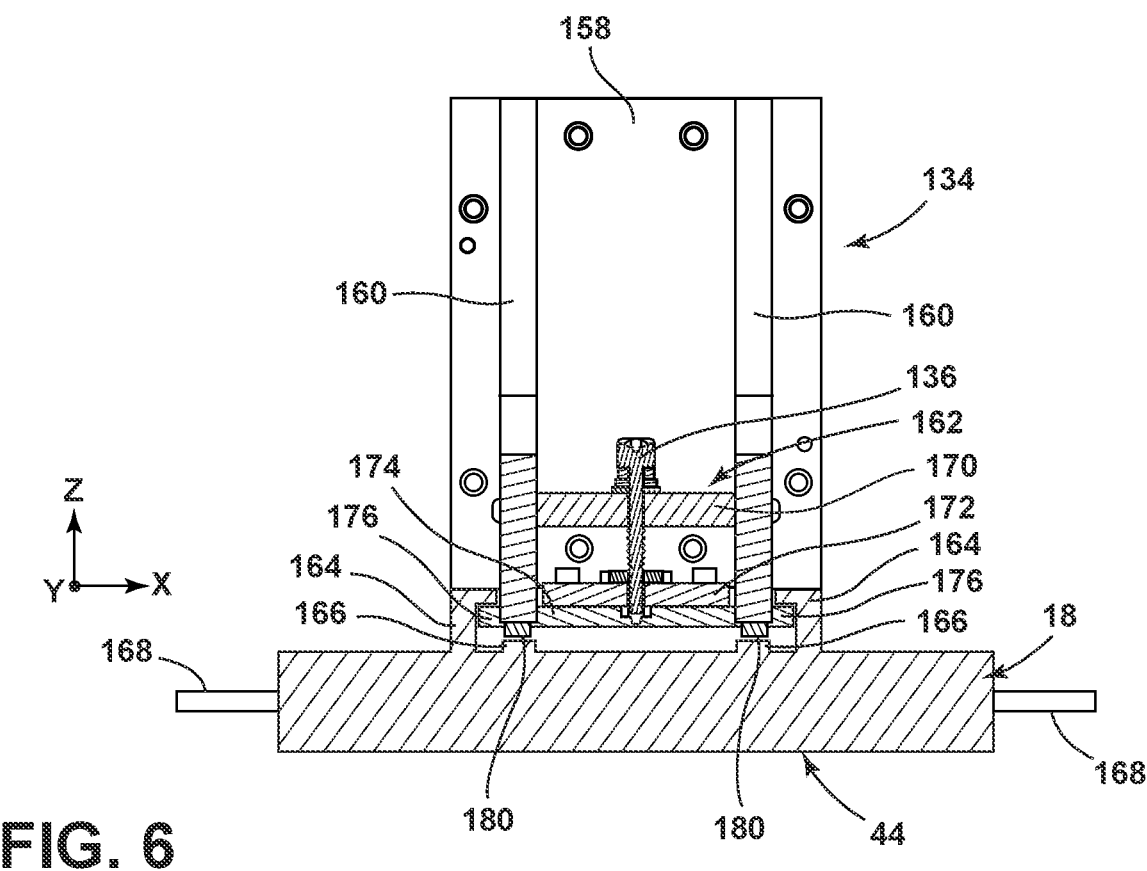
FIG. 6 is a cross-sectional view of the print head of the additive manufacturing apparatus taken along the line VI-VI of FIG. 2 in accordance with various aspects of the present disclosure.

Referring further to FIGS. 5 and 6, the print head 134 may include a print head mounting plate 158, one or more print head arms 160 extending from the print head mounting plate 158, and an attachment assembly 162. The print head 134 may be configured to selectively retain the stage 18.

In some embodiments, such as the one illustrated in FIG. 6, the stage 18 is a structure defining a planar surface 44, which is capable of being oriented parallel to a build surface 30 or the X-Y plane. The stage 18 may further include one or more stage rails 164 that are configured to interact with the print head 134. One or more datums 166 may also be positioned on and/or integrally formed with the stage 18. In some instances, the stage 18 may further include one or more handles 168.

Referring back to FIGS. 5 and 6, the clamp 136 of the attachment assembly 162 may selectively retain the stage 18 relative to the print head 134. In addition, the attachment assembly 162 may further include an anchor plate 170 and a clamping plate 172. In operation, the anchor plate 170 may maintain a common position when the clamp 136 is in both the unlocked and locked positions. The clamping plate 172 may be operably coupled with a clamping arm 174. The clamping plate 172 and the clamping arm 174 may move in conjunction with one another when the clamp 136 is moved from the unlocked position to the locked position and vice versa.

The clamping arm 174 may include one or more protrusions 176 that are configured to be positioned within the one or more rails 154 of the stage 18. In some instances, the one or more protrusions 176 may define notches 178 for assisting in locating the stage 18 relative to the protrusions 176. With the one or more protrusions 176 within the one or more rails 154 of the stage 18, the one or more datums 166 of the stage 18 can align with locators 180 within the attachment assembly 162. In various embodiments, as the clamp 136 is moved to the locked position, a distance between a bottom portion of the locators 180 and a top portion of the clamping arm 174 is increased in the Z-axis direction. The increased distance creates an expansion force on the rails 154 of the stage 18 and the one or more datums 166 thereby retaining the stage 18 in position relative to the print head 134.

Figure 7:
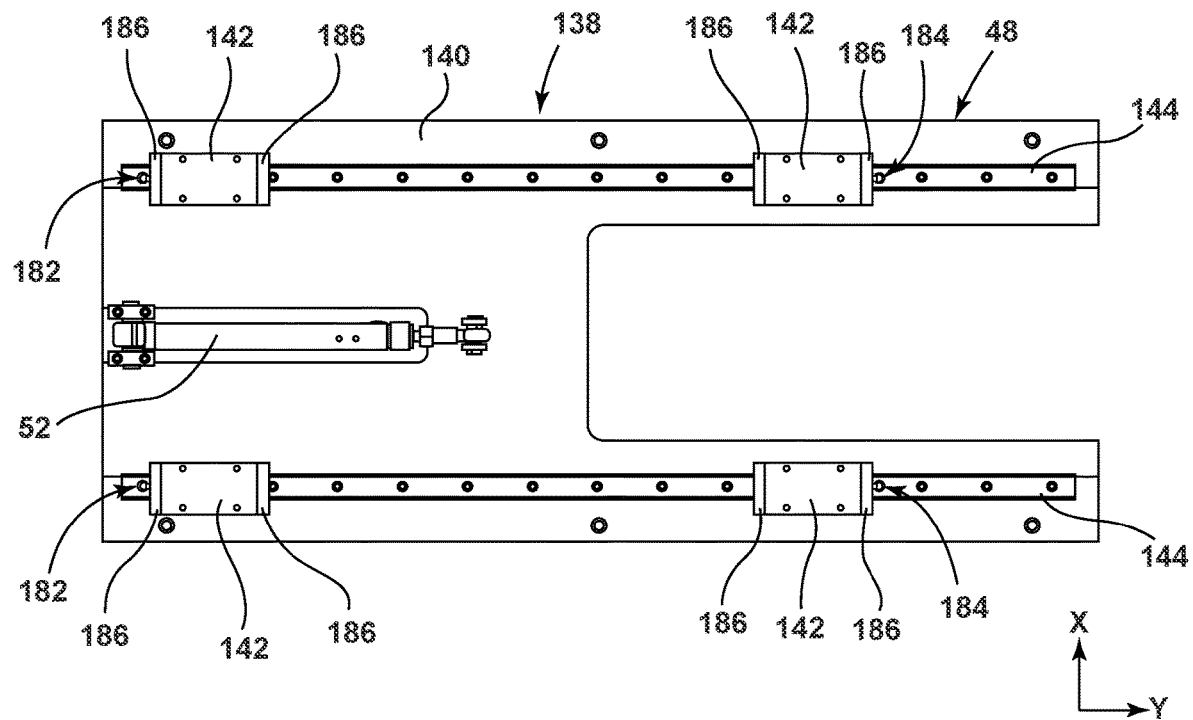
FIG. 7 is a top plan view of a first slide assembly of the additive manufacturing apparatus in accordance with various aspects of the present disclosure.
Figure 8:
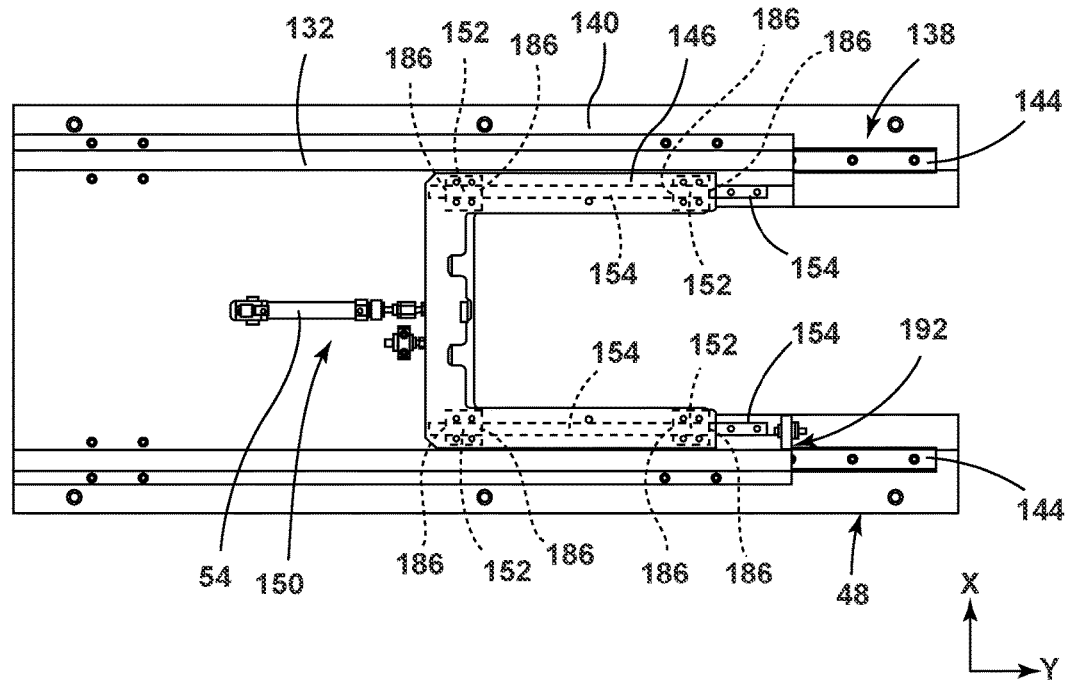
FIG. 8 is a top plan view of a second slide assembly of the additive manufacturing apparatus in accordance with various aspects of the present disclosure.

Referring further to FIGS. 7 and 8, as provided herein, the mounting plate 140 may have a pair of tracks 144 operably coupled thereto. A plurality of guides 142 are coupled with the base plate 132 and may be configured to move along the first slide assembly 138. As illustrated, the second actuator 52 may be operably coupled with the base plate 132 and the mounting plate 140 to move the base plate 132 relative to the mounting plate 140. In some instances, the second actuator 52 may be configured to move the base plate 132 between a first position and a second position.

In the first position, the stage 18 may be lowered by the first actuator 50 (FIG. 2) to a position over at least a portion of the resin R. When in the first position, the guides 142 may contact a first pair of stops 182. In the second position, the stage 18 may be lowered by the first actuator 50 (FIG. 2) to a position over at least a portion of the constituent material M. When in the second position, the guides 142 may contact a second pair of stops 184. It will be appreciated that the first slide assembly 138 may include a single first stop and/or a single second stop without departing from the scope of the present disclosure.

In various embodiments, each of the first pair of stops 182 and the second pair of stops 184 may be adjustable. For example, the first pair of stops 182, and the second pair of stops 184 can be in the form of fine threaded (e.g., 100 threads per inch (TPI)) adjustable end stops that allow precise positioning of each respective pair of end stops 182, 184. In some embodiments, the one or more guides 142 may include hardened standoffs 186 that are configured to engage with end stops 182, 184. The standoffs 186 can be removable and replaceable thereby allowing for easy replacement once the standoffs 186 in use are worn from use and/or for any other reason.

With further reference to FIG. 8, as provided herein, a second slide assembly 150 may include a pair of rails 154 operably coupled to the base plate 132. The second slide assembly 150 may also include one or more guides 152 coupled with the carrier plate 146. The guides 152 may be configured to move along the pair of rails 154. As illustrated, the third actuator 54 may be operably coupled with the base plate 132 and the carrier plate 146 to move the carrier plate 146 relative to the base plate 132. In some instances, the third actuator 54 may be configured to move the carrier plate 146 between a first position and a second position.

In the first position, the radiant energy device 20 may be positioned in a first location relative to the window 16 and/or the base plate 132. When in the first position, the guides 152 may contact a first stop 188. In the second position, the radiant energy device 20 may be positioned in a second location relative to the window 16 and/or the base plate 132 that is offset from the first location in the Y-axis direction. When in the second position, the guides 152 may contact a second stop 190.

In the illustrated embodiment of FIG. 8, the first stop 188 may be operably coupled to the base plate 132. The second stop 190 may be operably coupled with a flange 192 of the base plate 132. In various embodiments, each of the first end stop and the second end stop may be adjustable. For example, the first end stop, and the second end stop can be in the form of a fine threaded (e.g., 100 TPI) adjustable end stops that allow for precise positioning of each of the first end stop and the second end stop. In some embodiments, a first standoff 186 may be supported by the carrier plate 146 and configured to align with the first end stop. A second standoff 186 may be operably coupled with an opposing end of the carrier plate 146 and/or the guides 152 of the second slide assembly 150. Each of the first standoff 186 and the second standoff 186 can be removable and replaceable thereby allowing for easy replacement once the standoffs 186 in use are worn from use and/or for any other reason.

Figure 9:
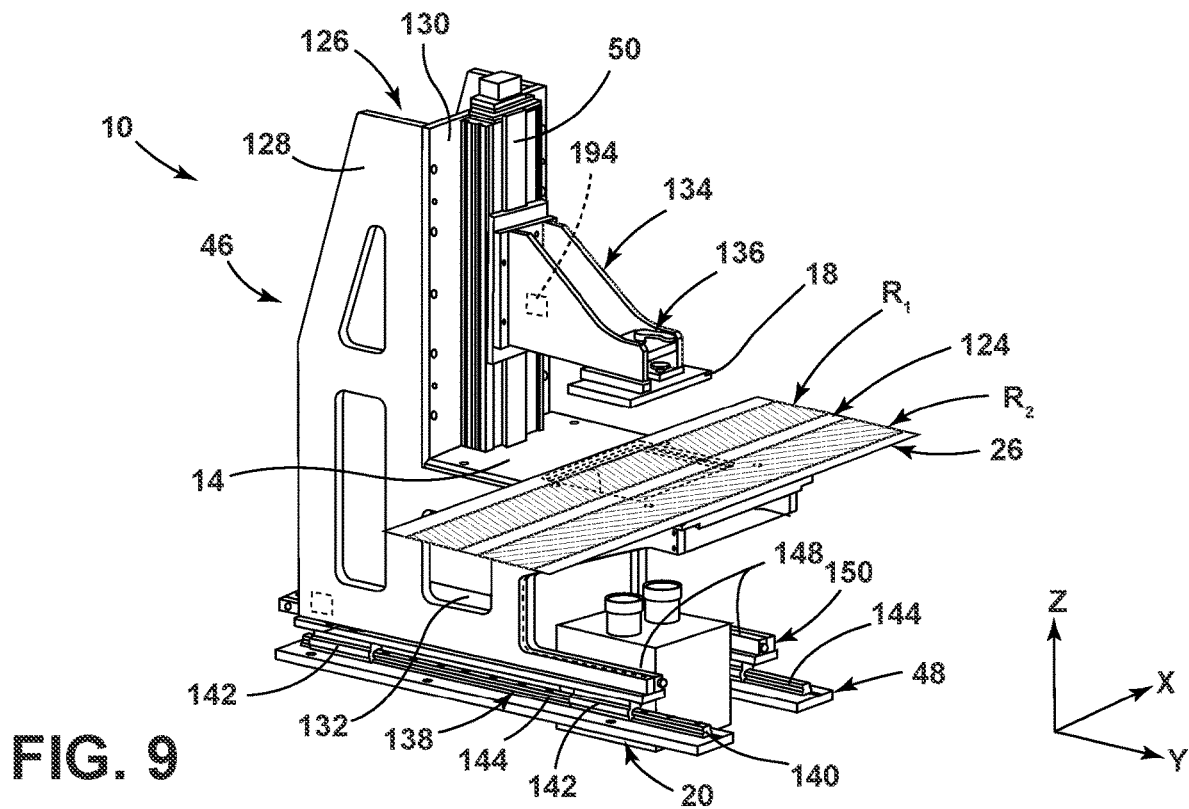
FIG. 9 is a side perspective view of the additive manufacturing apparatus with the stage in a first position and the radiant energy device in a first projection position in accordance with various aspects of the present disclosure.
Figure 10:
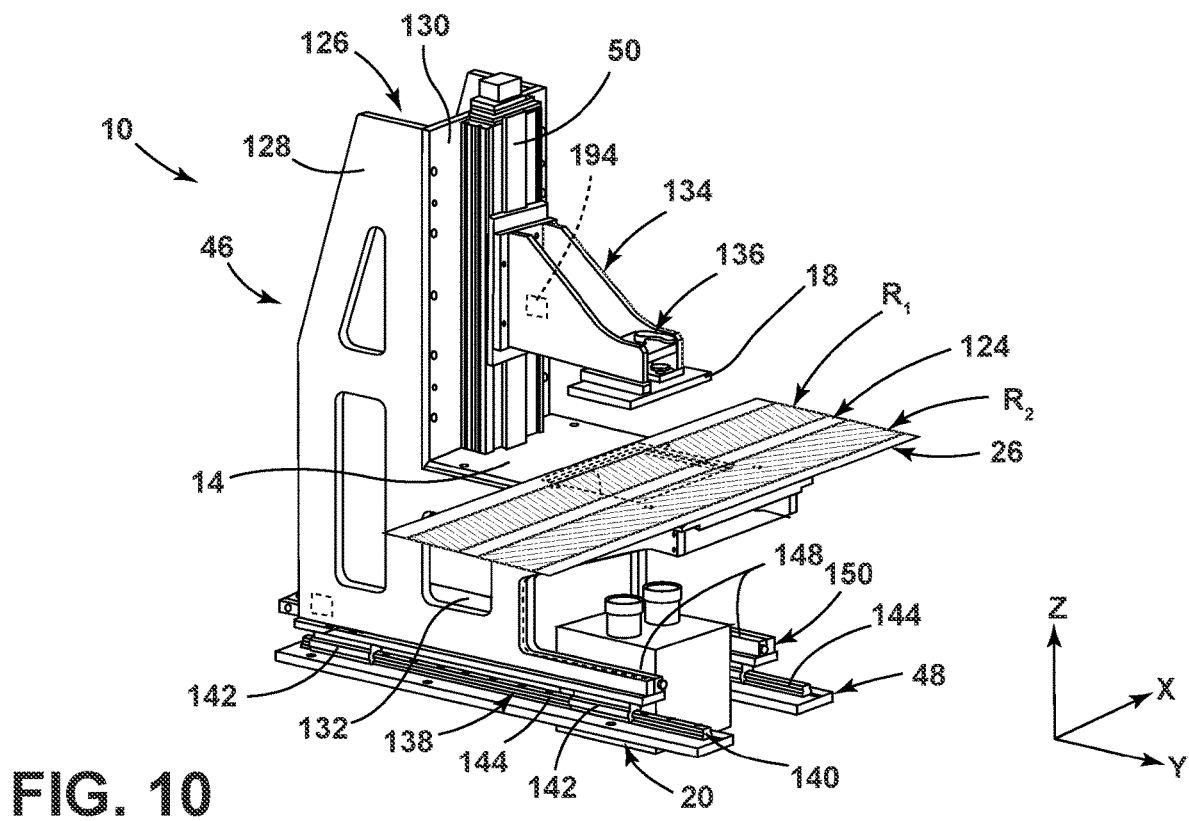
FIG. 10 is a side perspective view of the additive manufacturing apparatus with the stage in the first position and the radiant energy device in a second projection position in accordance with various aspects of the present disclosure.
Figure 11:
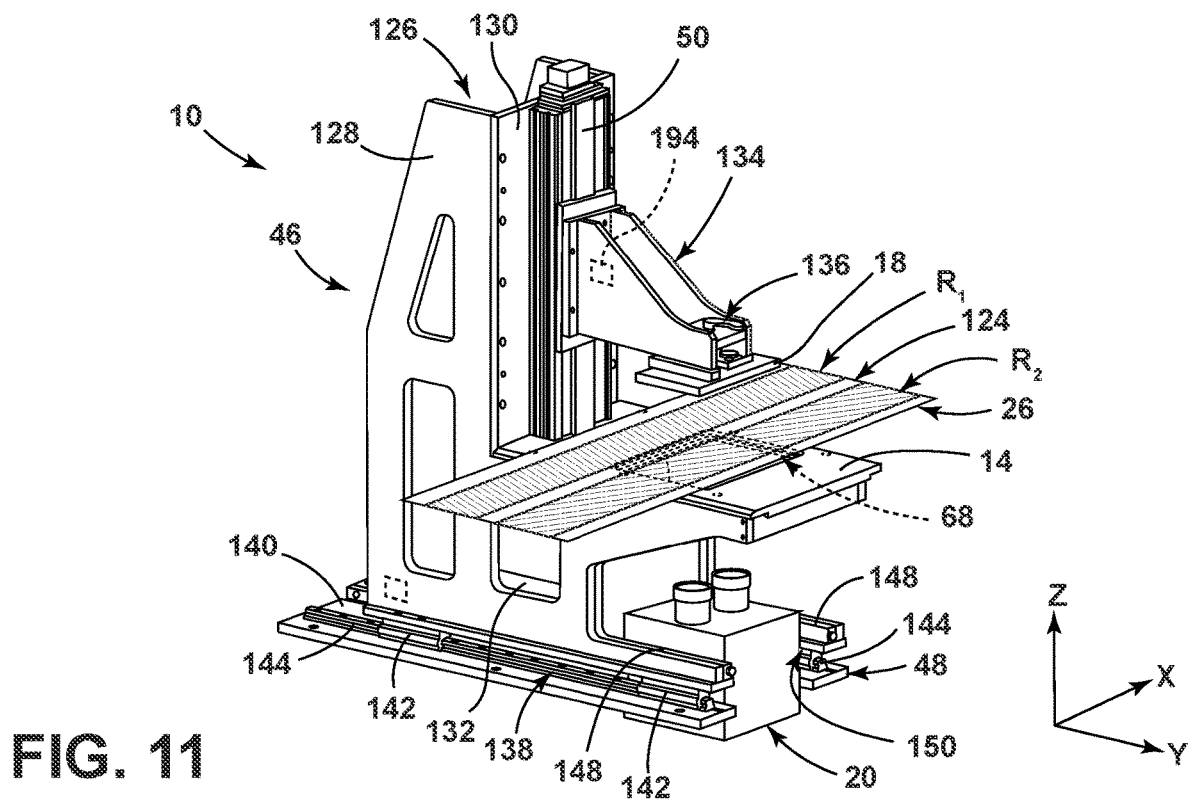
FIG. 11 is a side perspective view of the additive manufacturing apparatus with the stage in a second position and the radiant energy device in a third projection position in accordance with various aspects of the present disclosure.
Figure 12:
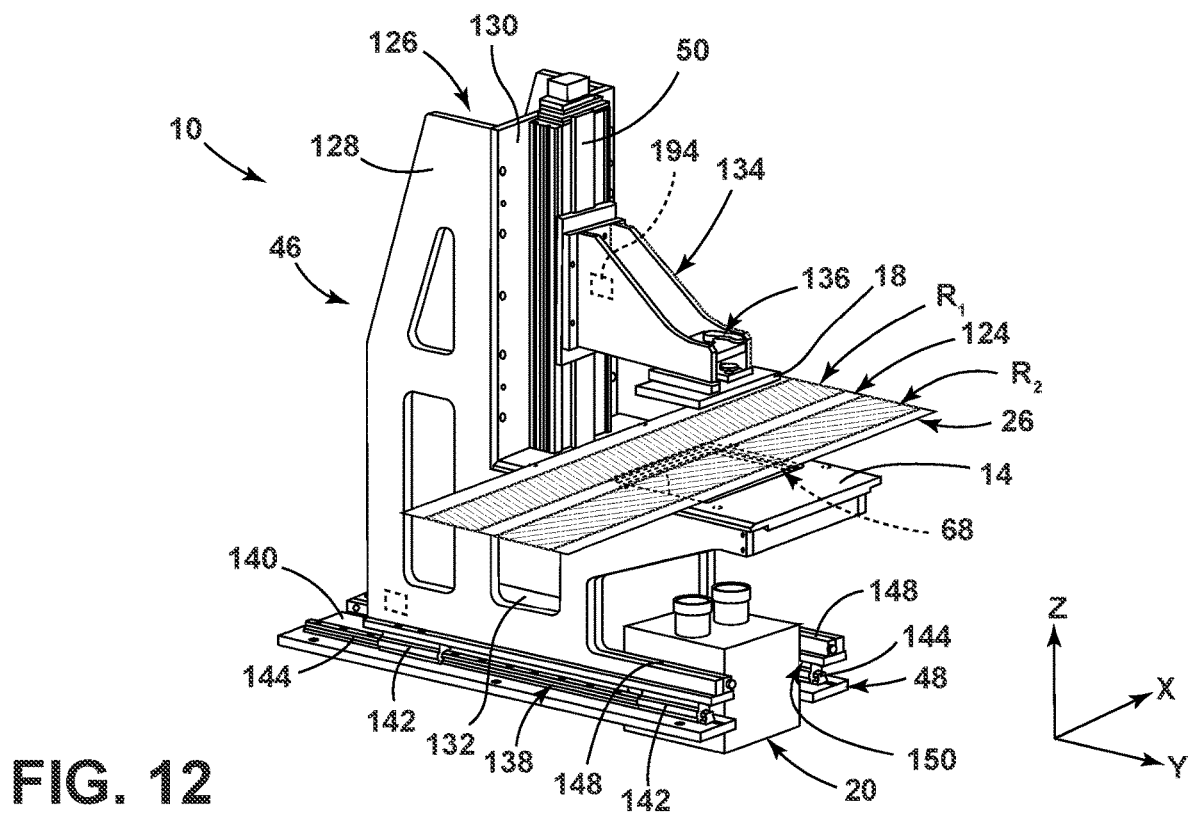
FIG. 12 is a side perspective view of the additive manufacturing apparatus with the stage in the second position and the radiant energy device in a fourth projection position in accordance with various aspects of the present disclosure.

Referring now to FIGS. 9-11, various perspective views of the additive manufacturing apparatus having the actuator assembly 46 are provided in accordance with various aspects of the present disclosure. As provided herein, the additive manufacturing apparatus may be configured to deposit a resin R and a constituent material M onto a support 26. The resin R may be laterally offset from the constituent material M on the support 26 in the Y-direction. In addition, a gap 124 may be defined between the laterally offset resin R and constituent material M.

The actuator assembly 46 may include a first actuator 50 configured to move the stage 18 in a plurality of locations along the Z-axis direction. The actuator assembly 46 may also include a second actuator 52 that may be associated with the first slide assembly 138. The first slide assembly 138 may be configured to move the stage 18 relative to the mounting plate 140. In addition, the actuator assembly 46 may include a third actuator 54 that is may be associated with the second slide assembly 150. The second slide assembly 150 may be configured to move the radiant energy device 20 relative to the frame 126 and/or the window 16.

During operation, the support 26 may be maintained in a generally consistent position. Conversely, the stage 18 and/or the radiant energy device 20 may be movable relative to the support 26 such that the resin R (or various portions of the resin R) and/or the constituent material M (or various portions of the second resin R) may be selectively cured.

For example, as illustrated in FIG. 9, the first slide assembly 138 may be placed in a first position relative to the mounting plate 140. In the first position, the guides 142 of the first slide assembly 138 may contact and/or be proximate to the first pair of stops 182. In the first position, the stage 18 may be generally aligned with the resin R in the Y-axis direction.

As also shown in FIG. 9, the second slide assembly 150 may be in the first position. In the first position, the guides 152 of the second slide assembly 150 may contact and/or be proximate to the first stop 188 of the second slide assembly 150. In the first position, the radiant energy device 20 may be in a first location relative to the window 16. As such, the radiant energy device 20 may be directed towards a first portion of the resin R.

As shown in FIG. 10, while the first slide assembly 138 is in the first position, the second slide assembly 150 may alternatively be in the second position. In the second position, the guides 152 of the second slide assembly 150 may contact and/or be proximate to the second stop 190 of the second slide assembly 150. In the second position, the radiant energy device 20 may be in a second location relative to the window 16. As such, the radiant energy device 20 may be directed towards a second portion of the resin R.

As illustrated in FIG. 11, the first slide assembly 138 may also be placed in a second position relative to the mounting plate 140. In the second position, the guides 142 of the first slide assembly 138 may contact and/or be proximate to the second pair of stops 184. In the second position, the stage 18 may be generally aligned with the constituent material M in the Y-axis direction.

During operation, each of the slide assemblies may be manipulated in any order to form a component 12 formed from one or both of the resin R and the constituent material M. In some instances, the radiant energy device 20 may be configured as any device or combination of devices operable to generate and project radiant energy at the resin R in a suitable pattern and with a suitable energy level and other operating characteristics to cure the resin R during the build process. In addition, the radiant energy device 20 may or may not be configured to translate below the window 16 and/or the support plate 14. For example, as shown in FIGS. 9-11, the radiant energy device 20 may include a first projector 56 and a second projector 56. Each of the first projector 56 and the second projector 56 may generate an image 64 that at least partially overlaps with an image 64 of an additional radiant energy device to form a stitched image 64 on the resin R. In various embodiments, the images 64 from each of the plurality of radiant energy devices 20 may have some degree of overlap where that overlap is a single pixel, less than one pixel (for example, half a pixel), or more than one pixel. Additionally or alternatively, the radiant energy device 20 may be capable of performing a scanning process in which the consecutive patterned images 64 are emitted from the radiant energy device 20 as the radiant energy device 20 is translated along the movement device 80. As such, in some embodiments, the image 64 from the first projector 56 and the image 64 from the second projector 56 may be statically, or mechanically, stitched together. Additionally or alternatively, multiple images 64 from the first projector 56 may be stitched with one another as the third actuator 54 alters a position of the first projector 56. Likewise, multiple images 64 from the second projector 56 may be stitched with one another as the third actuator 54 alters a position of the second projector 56.

Further, in some embodiments, the apparatus 10 may include one or more sensors 194 that are configured to detect information related to a position of the printhead 134, the frame 126, and/or the radiant energy device 20. For example, the one or more sensors 194 may verify the position of the stage 18 each time the stage 18 is moved. Additionally or alternatively, the one or more sensors 194 may verify the location of the frame 126 each time the frame 126 is translated. Additionally or alternatively, the one or more sensors 194 may verify the location of the radiant energy device 20 each time the radiant energy device 20 is translated by the movement device 80. In various embodiments, the one or more sensors 194 may be any combination of devices that is configured to provide information indicative of a position of the printhead 134, the frame 126, and/or the radiant energy device 20. For example, the one or more sensors 194 may include a gyroscope, an accelerometer, a proximity sensor, an image sensor, and/or any other practicable sensor.

Figure 13:
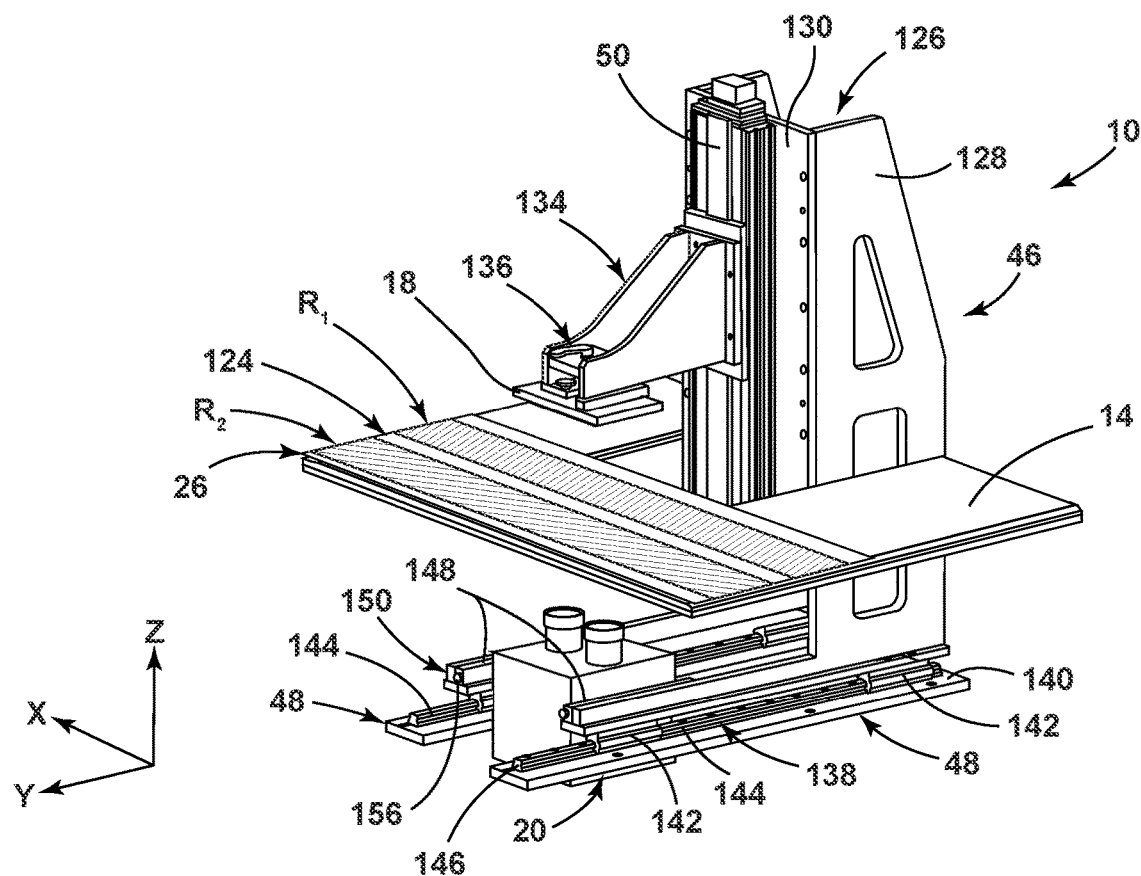
FIG. 13 is a side perspective view of the additive manufacturing apparatus in accordance with various aspects of the present disclosure.

Referring now to FIG. 13, a perspective view of the additive manufacturing apparatus is provided in accordance with various aspects of the present disclosure. As provided herein, the additive manufacturing apparatus may be configured to deposit a resin R and a constituent material M onto a support 26. The resin R may be laterally offset from the constituent material M on the support 26 in the Y-direction.

As illustrated, in various embodiments, the frame 126 may be movable relative to the support plate 14 and the window 16. As such, in some instances, there may be little to no relative motion between the support 26 and the support plate 14 and the window 16 in the Y-axis direction.

In some embodiments, an opening 196 may be defined between the support plate 14 and the frame 126 to accommodate for movement of the frame 126 relative to the support plate 14. The opening 196 may have a length in the Y-axis direction that is at least equal to the length of travel of the build plate 130 when the frame 126 is moved from the first position to the second position.

Figure 14:
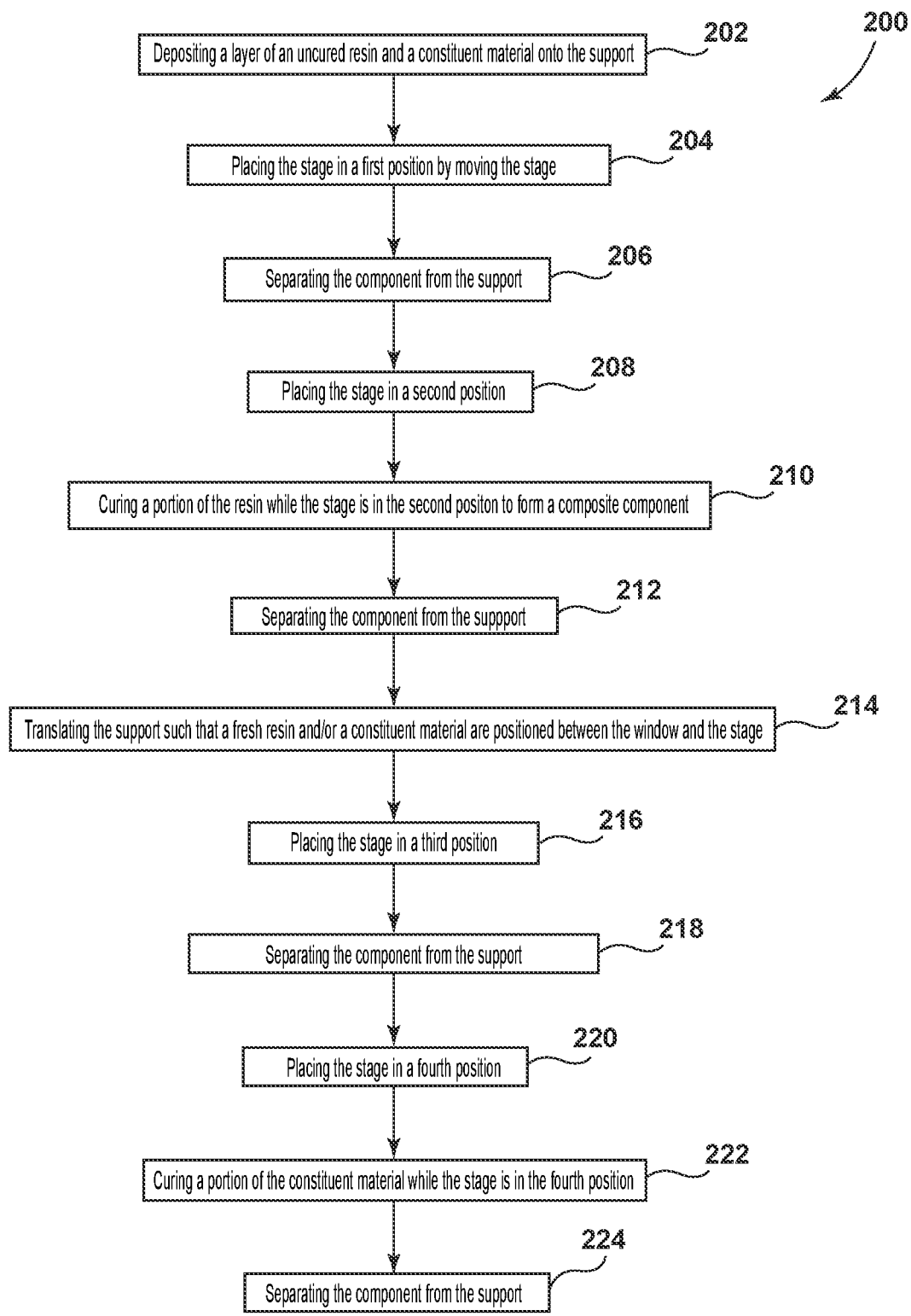
FIG. 14 is a method of operating the additive manufacturing apparatus in accordance with various aspects of the present disclosure.

Referring now to FIG. 14, a method 200 for operating an additive manufacturing apparatus 10 is provided in accordance with various aspects of the present disclosure. The various steps of method 200 are schematically illustrated in FIGS. 14-27. The method 200 can be used to operate the additive manufacturing apparatus 10 or any other suitable additive manufacturing apparatus 10. It should be appreciated that the example method 200 is discussed herein only to describe example aspects of the present subject matter and is not intended to be limiting. Any of the steps within FIG. 14 may be omitted without departing from the scope of the present disclosure.

Figure 15:
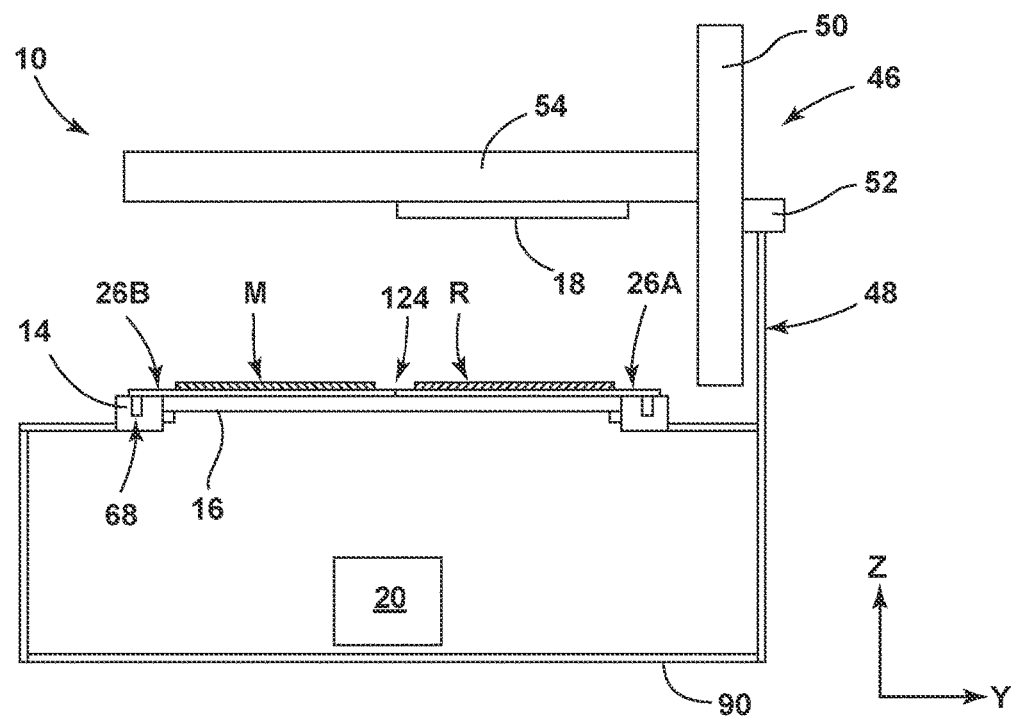
FIGS. 15-27 illustrate schematic views of the additive manufacturing apparatus during operation of the apparatus in accordance with various aspects of the present disclosure.

Referring now to FIGS. 14 and 15, the method 200 can include, at step 202, depositing a layer of an uncured resin and a constituent material onto the support 26. In various embodiments, the resin R may be laterally offset from the constituent material M on the support 26 in the Y-direction. Further, a gap 124 may be defined between the laterally offset resin R and constituent material M.

In addition, the support 26 may be in the form of a first support 26A that is configured to have the resin R deposited thereon and a second support 26B that is configured to have the constituent material M deposited thereon. Each of the first support 26A and the second support 26B may be operably coupled with the feed module 22 and the take-up module 24. Conversely, the resin R and the constituent material M may be deposited on a common support 26.

While the resin R and/or the constituent material M is deposited onto the support 26 and/or after the deposition of the resin R and/or the constituent material M onto the support 26, the support 26 may be translated in an X-axis direction into a build zone 32.

Figure 16:
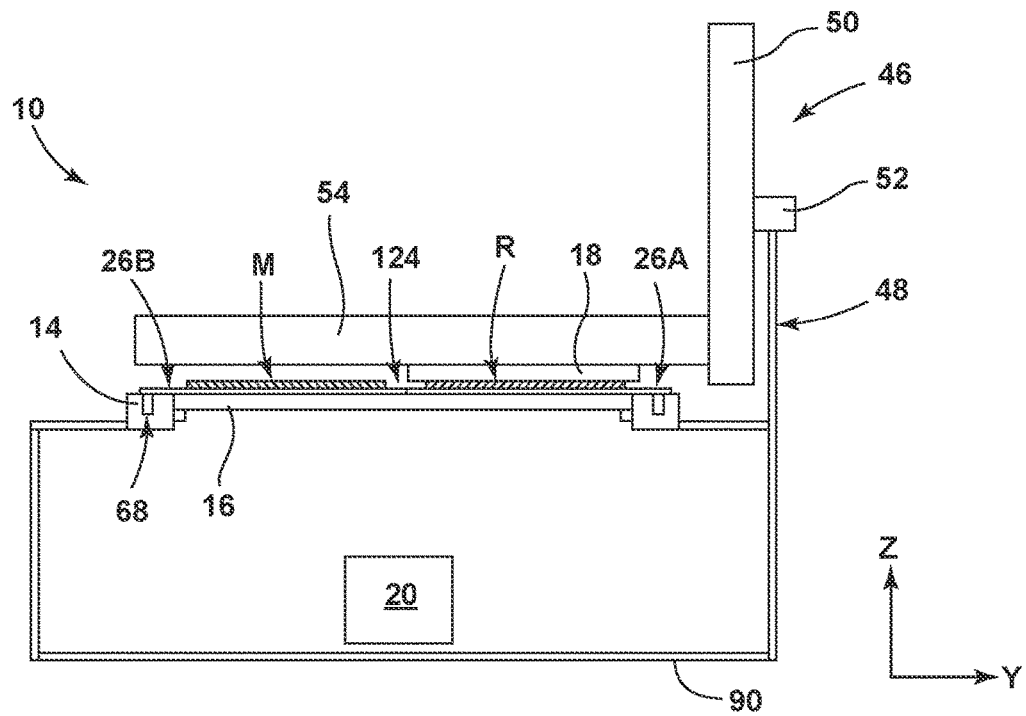

As shown in FIGS. 14 and 16, at step 204, the method 200 can include placing the stage 18 in a first position by moving the stage 18 such that a working surface of the stage 18 and/or the component 12 retained by the stage 18 contacts the resin R. As the stage 18 is moved to the first position, a working surface of the stage 18 and/or the component 12 retained by the stage 18 contacts the resin R. In some instances, the method 200 can include partially curing a portion of the resin R while the stage 18 is in the first curing position relative to a window 16 by applying radiant energy from a radiant energy device 20 through the window 16 and the support 26. As provided herein, the radiant energy may be in the form of a first patterned image 64 that is transmitted through at least a portion of the window 16. The portion of the resin R that is cured forms a layer of the component 12 that is retained by the stage 18.

Figure 17:
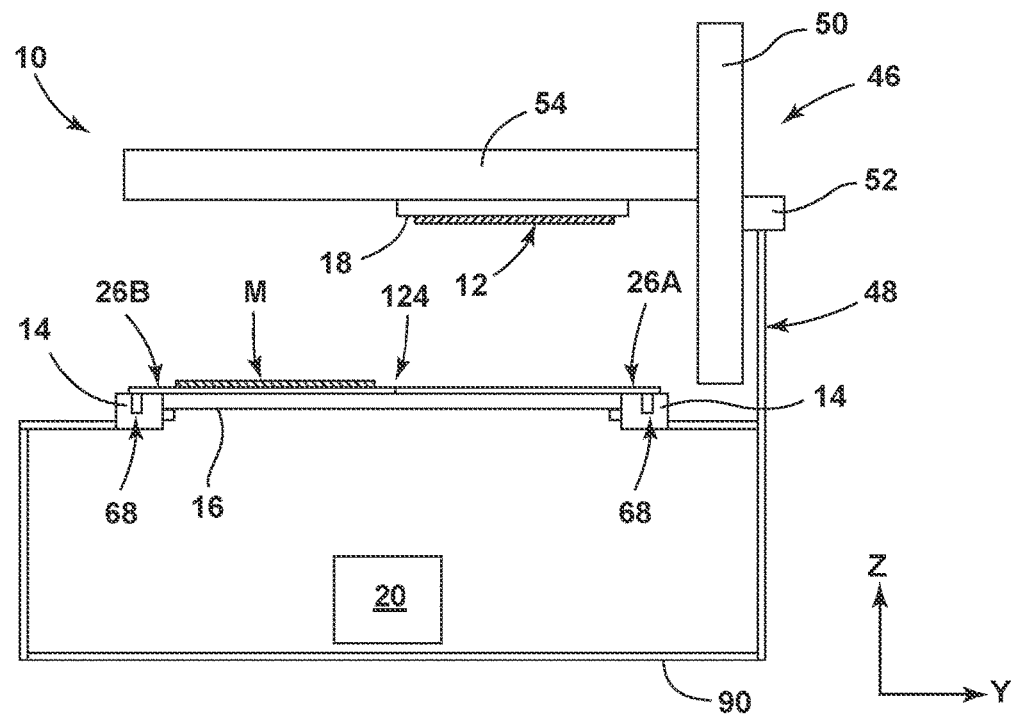

As shown in FIGS. 14 and 17, at step 206, the method 200 can include separating the component 12 from the support 26 by altering a position of the stage 18 through the actuator assembly 46. It will be appreciated that the stage 18 may move in the X-axis direction, the Y-axis direction, and/or the Z-axis direction.

Figure 18:
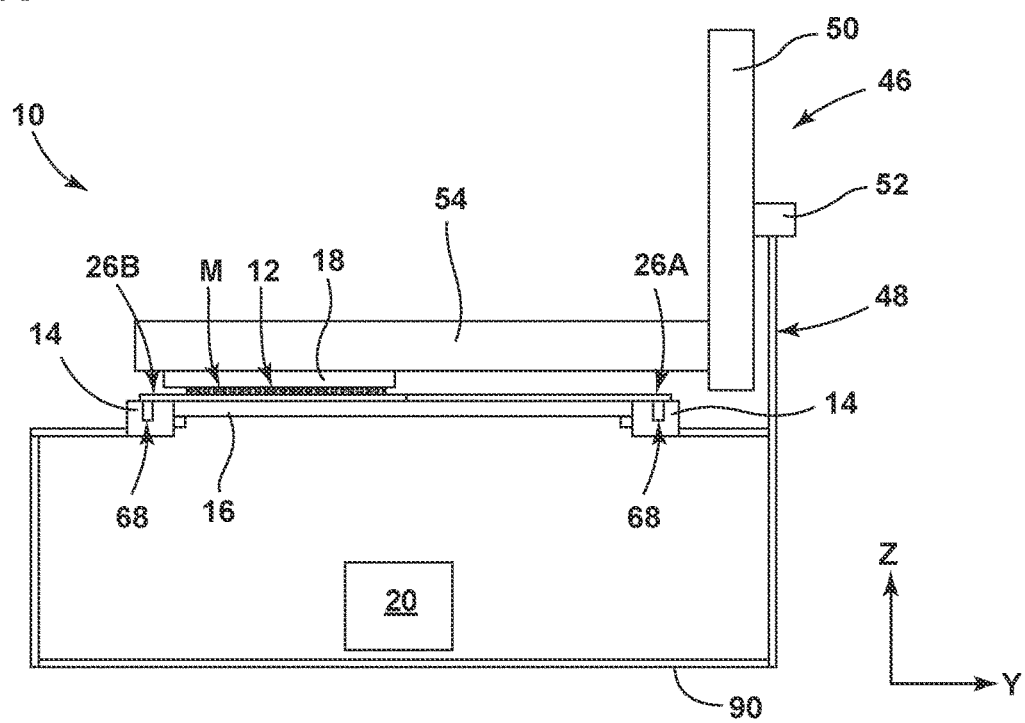

As shown in FIGS. 14 and 18, at step 208, the method 200 can include placing the stage 18 in a second position by moving the stage 18 such that the working surface of the component 12 retained by the stage 18 contacts the constituent material M. As the stage 18 is moved to the second position, the working surface of the component 12 retained by the stage 18 contacts the constituent material M. As the resin R is at least partially uncured, the constituent material M may be at least partially within the resin R thereby forming a composite substance.

Figure 19:
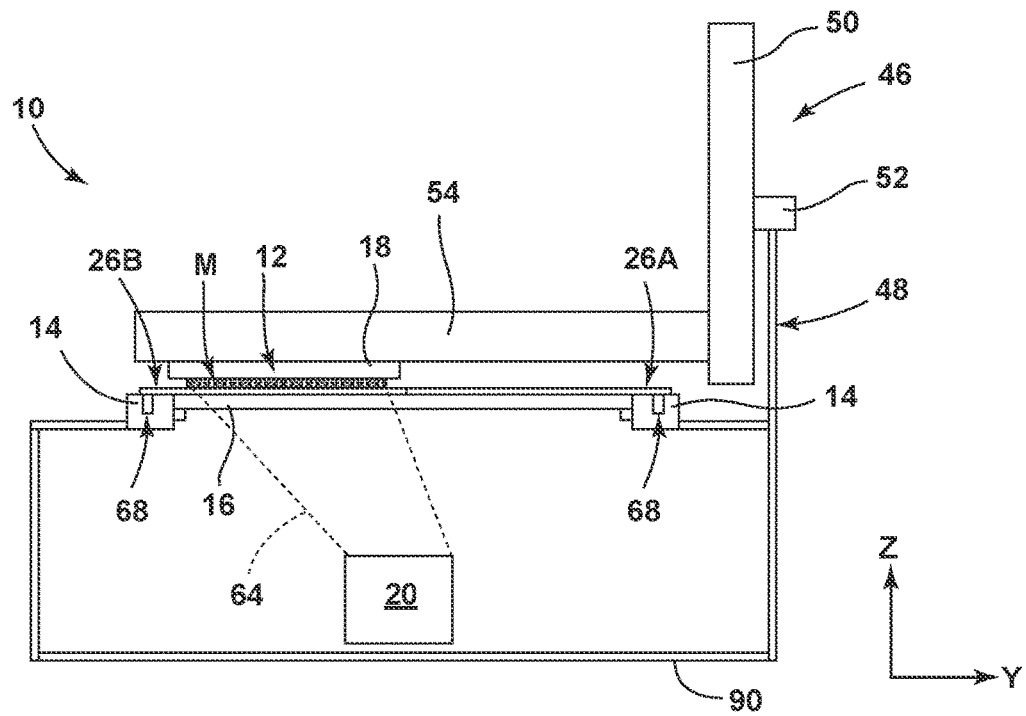

As shown in FIGS. 14 and 19, at step 210, the method 200 can include curing a portion of the resin R while the stage 18 is in the second position relative to a window 16 by applying radiant energy from a radiant energy device 20 through the window 16 and the support 26. As provided herein, the radiant energy may be in the form of a patterned image 64 that is transmitted through at least a portion of the window 16. The portion of the constituent material M that is cured forms a composite layer of the component 12 that is retained by the stage 18. In the illustrated embodiment of FIG. 19, the patterned image 64 is generally equal to the width of the constituent material M in the Y-axis direction. However, the second portion may be of any width (varied or constant) in the Y-axis direction.

In some instances, curing a portion of the resin R can further include positioning the radiant energy device 20 in a first projection position, wherein the portion of the resin is cured while the radiant energy device is in the first projection position. Additionally, curing a portion of the resin R can further include positioning the radiant energy device 20 in a second projection position, wherein the second projection curing position is offset from the first projection position in the Y-axis direction, and wherein the portion of the resin is cured while the radiant energy device 20 is in the second projection position.

Figure 20:
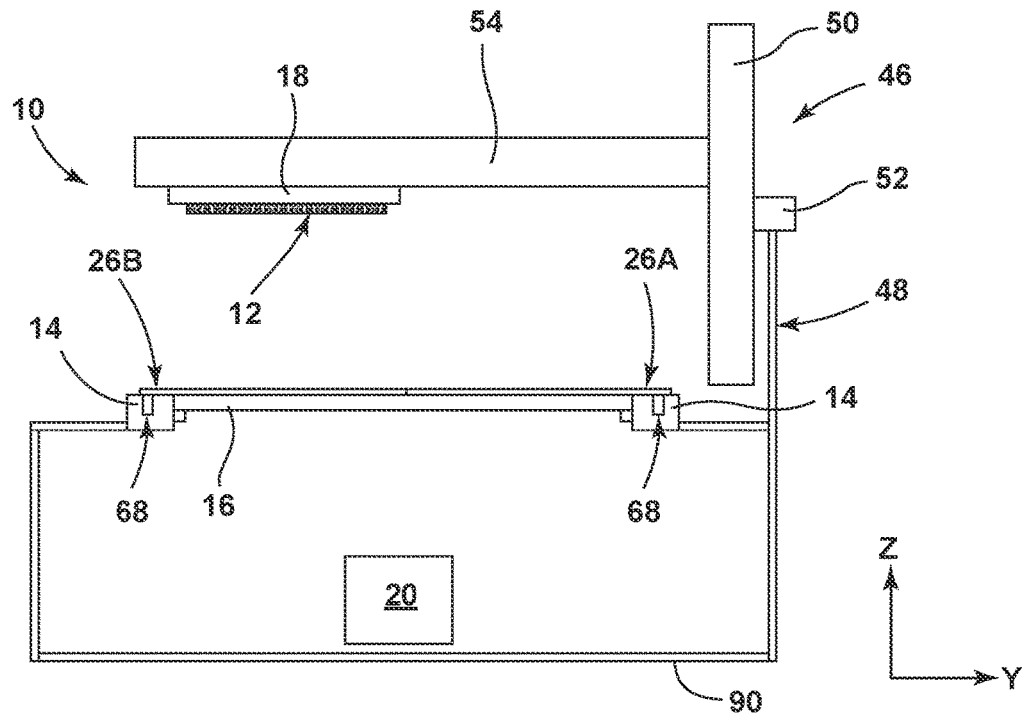

As shown in FIGS. 14 and 20, at step 212, the method 200 can include separating the component 12 from the support 26 by altering a position of the stage 18 through the actuator assembly 46. It will be appreciated that the stage 18 may move in the X-axis direction, the Y-axis direction, and/or the Z-axis direction.

Figure 21:
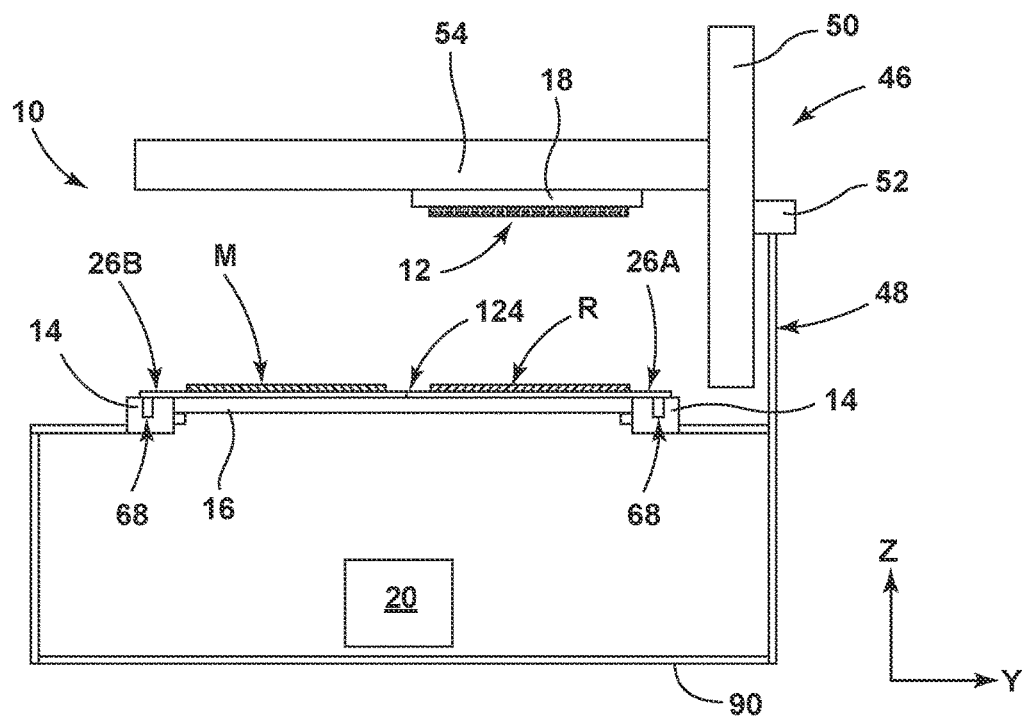

As shown in FIGS. 14 and 21, at step 214, after the component 12 is separated from the support 26, the method 200 can include translating the support 26 such that a fresh resin R and/or a constituent material M are positioned between the window 16 and the stage 18. It will be appreciated, however, that in various embodiments, after a portion of the resin R is cured and/or the constituent material M is positioned within the resin R, the support 26 respectively supporting the resin R and/or the constituent material M may be translated. Additionally or alternatively, the support 26 may be translated whenever the next layer to be formed requires fresh resin R and/or constituent material M. While the support 26 is translated, the stage 18 and the component 12 attached to the stage 18 may move based on the next layer to be formed.

Figure 22:
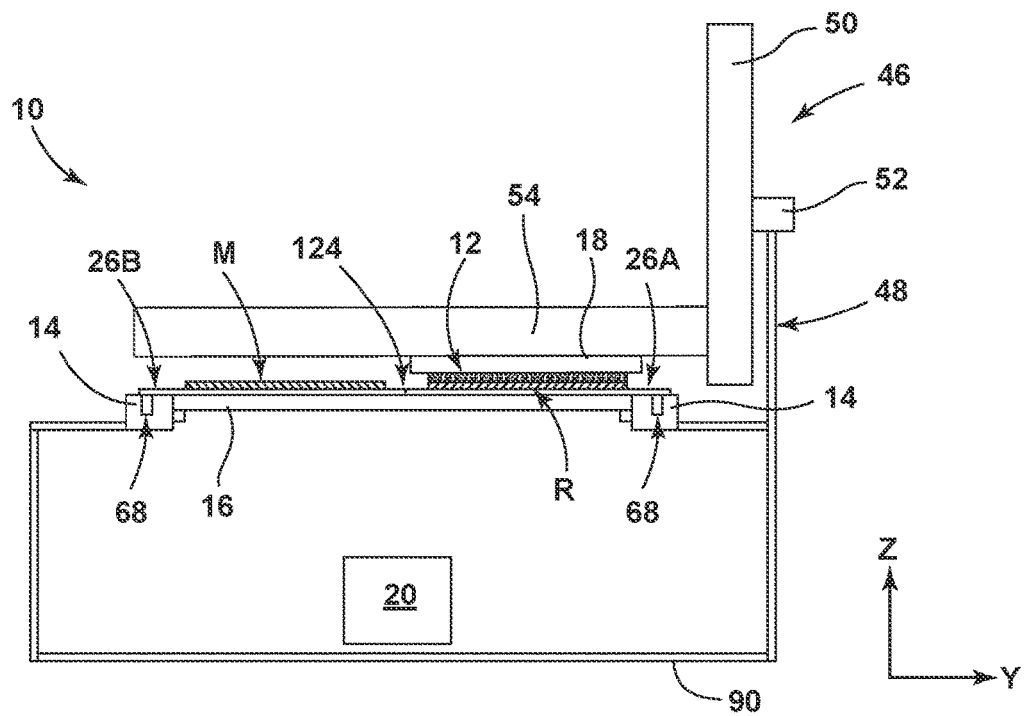

As shown in FIGS. 14 and 22, at step 216, the method 200 can include placing the stage 18 in a third position by moving the stage 18 such that the working surface of the component 12 retained by the stage 18 contacts the resin R. As the stage 18 is moved to the third position, the working surface of the component 12 retained by the stage 18 contacts the resin R. In some instances, the previous layer of constituent material M may extend externally of the working surface of the component 12 which may be positioned within the resin R when the stage 18 is positioned in the third position. In some instances, the method 200 can include partially curing a portion of the resin R while the stage 18 is in the third position relative to a window 16 by applying radiant energy from a radiant energy device 20 through the window 16 and the support 26. As provided herein, the radiant energy may be in the form of a patterned image 64 that is transmitted through at least a portion of the window 16. The portion of the resin R that is cured forms a layer of the component 12 that is retained by the stage 18. In the exemplary embodiment of FIG. 15, the patterned image 64 is less than the width of the resin R in the Y-axis direction.

However, the cured portion may be of any width (varied or constant) in the Y-axis direction.

Figure 23:
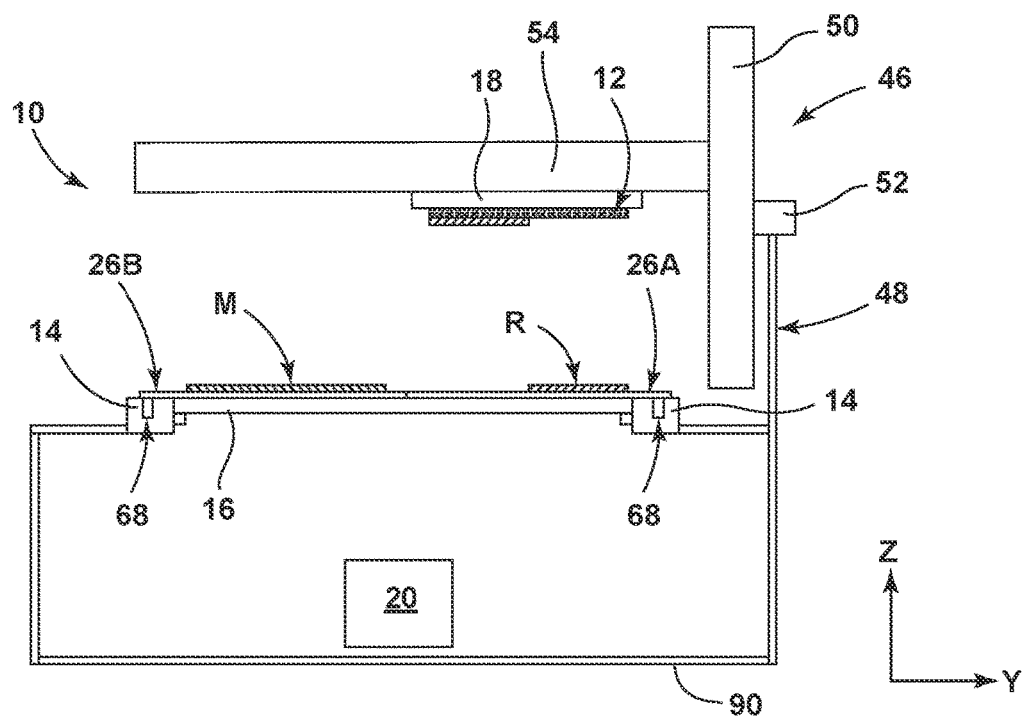
Figure 24:
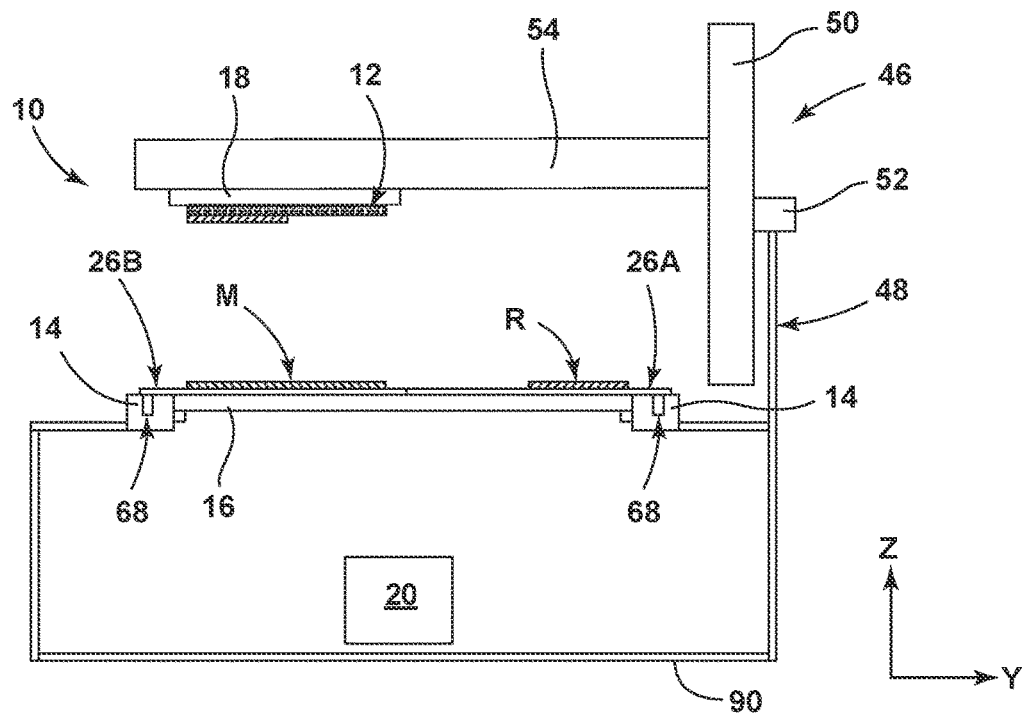

As shown in FIGS. 14, 23, and 24, at step 218, the method 200 can include separating the component 12 from the support 26 by altering a position of the stage 18 through the actuator assembly 46. It will be appreciated that the stage 18 may move in the X-axis direction, the Y-axis direction, and/or the Z-axis direction.

Figure 25:
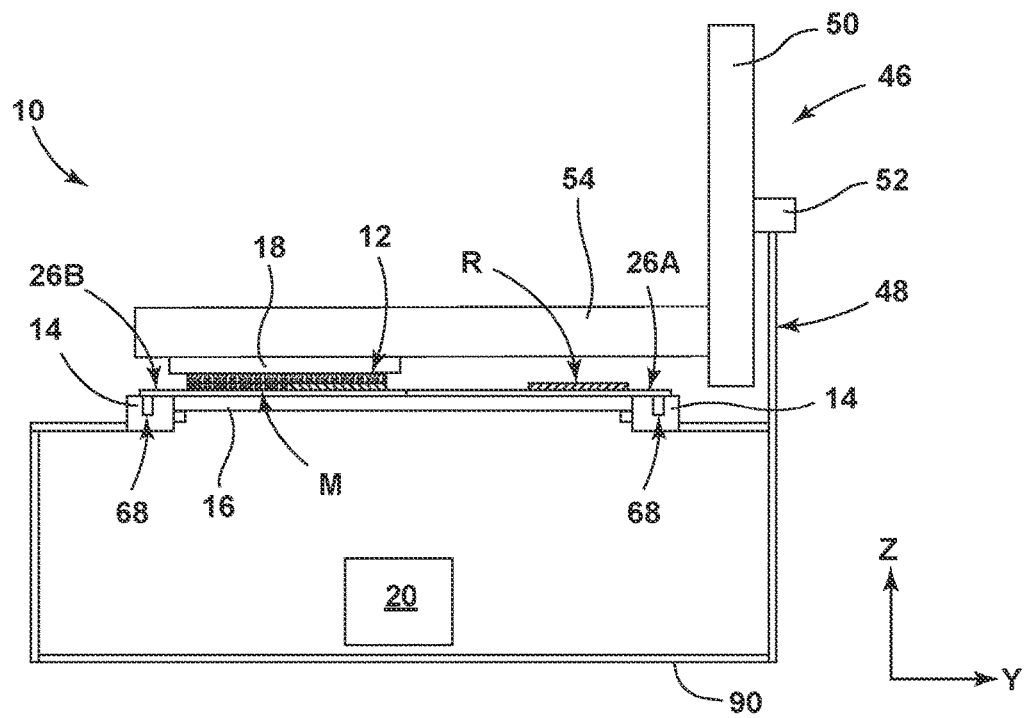

As shown in FIGS. 14 and 25, at step 220, the method 200 can include placing the stage 18 in a fourth position by moving the stage 18 such that the working surface of the component 12 retained by the stage 18 contacts the constituent material M. As the stage 18 is moved to the fourth position, the working surface of the component 12 retained by the stage 18 contacts the constituent material M.

Figure 26:
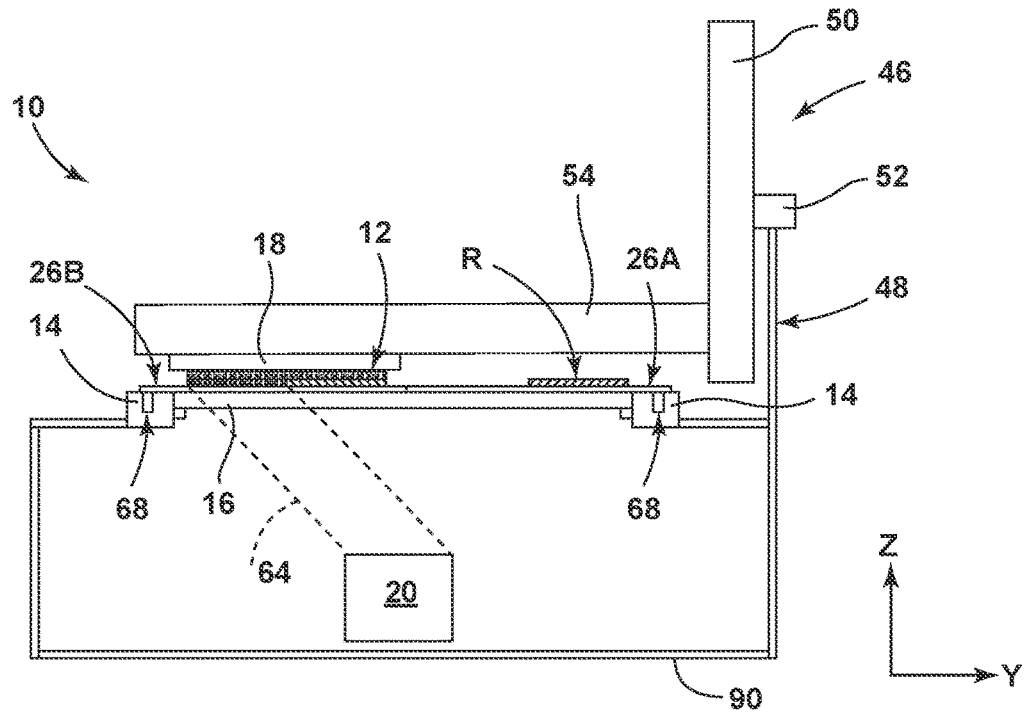

As shown in FIGS. 14 and 26, at step 222, the method 200 can include curing a portion of the constituent material M while the stage 18 is in the fourth position relative to a window 16 by applying radiant energy from a radiant energy device 20 through the window 16 and the support 26. As provided herein, the radiant energy may be in the form of a patterned image 64 that is transmitted through at least a portion of the window 16. The portion of the constituent material M that is cured forms a layer of the composite component 12 that is retained by the stage 18. In the illustrated embodiment of FIG. 26, the patterned image 64 is less than the width of the constituent material M in the Y-axis direction. However, the cured portion may be of any width (varied or constant) in the Y-axis direction.

Figure 27:
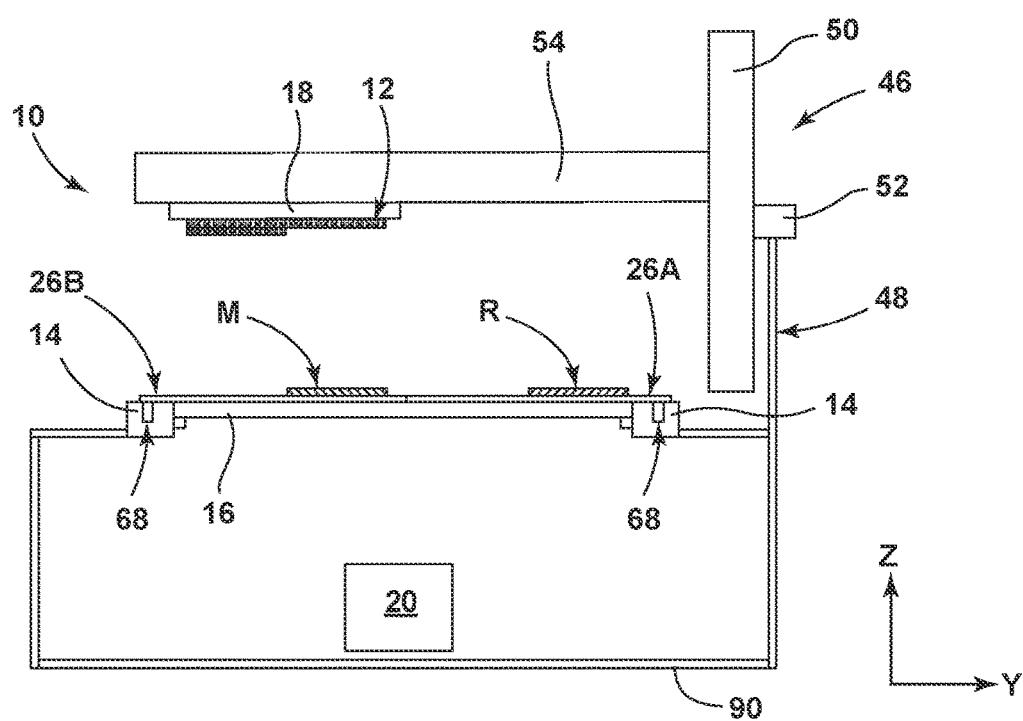

As shown in FIGS. 14 and 27, at step 224, the method 200 can include separating the component 12 from the support 26 by altering a position of the stage 18 through the actuator assembly 46. It will be appreciated that the stage 18 may move in the X-axis direction, the Y-axis direction, and/or the Z-axis direction. It will be appreciated that the stage 18 and the support 26 may move to any number (one or more) positions to form each layer of the component 12 based on the component design.

Figure 28:
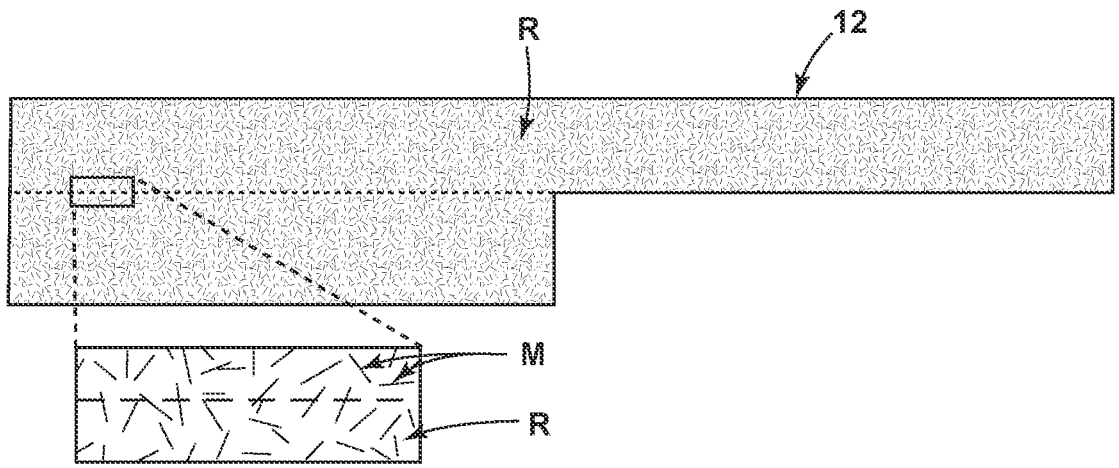
FIG. 28 is a side perspective view of the component having short fibers in accordance with various aspects of the present disclosure.
Figure 29:
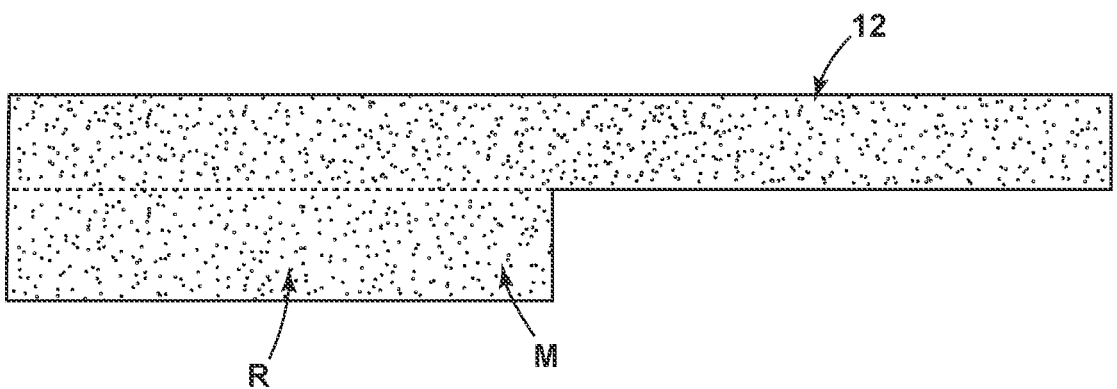
FIG. 29 is a side perspective view of the component having a powder in accordance with various aspects of the present disclosure.

Referring now to FIGS. 28 and 29, composite components having first and second layers, which may be formed by the method described in FIGS. 14-27, are illustrated according to various aspects of the present disclosure. While the illustrated component has a pair of layers, it will be appreciated that the component 12 may have any number (e.g., one or more) layers without departing from the teachings provided herein.

With further reference to FIG. 28, in various embodiments, the constituent material M may be in the form of a short fiber, which may have a length that is between 0.5 millimeters (mm) and 10 mm, or any other practicable length. Adding short fibers to the resin may improve the composite component performance for various applications. In various examples, the fiber length distribution (FLD) may be of any practicable concentration and the fiber orientation distribution (FOD) may be of any practicable orientation. Moreover, in some cases, the FLD and/or the FOD may be common throughout the component 12 and/or varied within various portions of the component 12.

As illustrated, the constituent material M may extend beyond a surface of the resin R for a respective layer. As an additional layer of resin R is disposed on the component, the resin R may surround at least some of the constituent material M extending beyond the resin R thereby further attaching subsequent layers of resin R to one another to further add rigidity to the composite component 12. Additionally or alternatively, one or more post-manufacturing processes may be used to remove any constituent material M that extends beyond a resin surface of the component 12.

With further reference to FIG. 29, in various embodiments, the constituent material M may be in the form of a powder, which may be a metallic powder, carbon-based powder, ceramic powder (e.g., Silicon carbide (SiC), aluminum oxide (Al2O3), silicon dioxide (SiO2)), polymeric powders, and/or any other practicable constituent material. In some cases, the constituent material M may have a particle size between 1-1000 μm to form printed hybrid components 12 with a higher green density. In various examples, the concentration and/or particle size of the constituent material M may be varied within various portions of the component 12.

Figure 30:
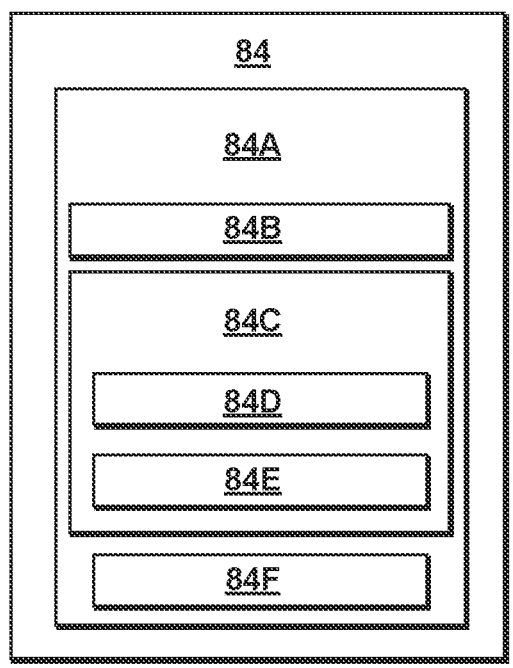
FIG. 30 depicts an exemplary computing system for an additive manufacturing apparatus in accordance with various aspects of the present disclosure.

FIG. 30 depicts certain components of a computing system 84 according to example embodiments of the present disclosure. The computing system 84 can include one or more computing device(s) 84A which may be used to implement the methods 200 described herein. The computing device(s) 84A can include one or more processor(s) 84B and one or more memory device(s) 84C. The one or more processor(s) 84B can include any suitable processing device, such as a microprocessor, microcontroller, integrated circuit, an application-specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 84C can include one or more non-transitory computer-readable storage medium(s), such as RAM, ROM, EEPROM, EPROM, flash memory devices, magnetic disks, etc., and/or combinations thereof.

The memory device(s) 84C can include one or more computer-readable media and can store information accessible by the one or more processor(s) 84B, including instructions 84D that can be executed by the one or more processor(s) 84B. The instructions 84D may include one or more steps of the methods 200 described above, such as to execute operations at the additive manufacturing apparatus 10 described herein. The memory device(s) 84C can store instructions 84D for running one or more software applications, displaying a user interface, receiving user input, processing user input, etc. In some implementations, the instructions 84D can be executed by the one or more processor(s) 84B to cause the one or more processor(s) 84B to perform operations, e.g., such as one or more portions of the methods 200 described herein. The instructions 84D can be software written in any suitable programming language or can be implemented in hardware. Additionally, and/or alternatively, the instructions 84D can be executed in logically and/or virtually separate threads on the processor(s) 84B.

The one or more memory device(s) 84C can also store data 84E that can be retrieved, manipulated, created, or stored by the one or more processor(s) 84B. The data 84E can include, for instance, data to facilitate the performance of the methods 200 described herein. The data 84E can be stored in one or more database(s). The one or more database(s) can be connected to computing system 84 by a high bandwidth LAN or WAN, or can also be connected to the computing system 84 through the network(s). The one or more database(s) can be split up so that they are located in multiple locales. In some implementations, the data 84E can be received from another device.

The computing device(s) 84A can also include a communication module or interface 84F used to communicate with one or more another component (s) of the computing system 84 or the additive manufacturing apparatus 10 over the network(s). The communication interface 84F can include any suitable components for interfacing with one or more network(s), including, for example, transmitters, receivers, ports, controllers, antennas, or other suitable components.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods 200 described herein may be used for forming components using any suitable material. For example, the resin R may be plastic, metal, concrete, ceramic, polymer, epoxy, photopolymer powder, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

Aspects of the invention(s) are provided by the subject matter of the following clauses, which are intended to cover all suitable combinations unless dictated otherwise based on logic or the context of the clauses and/or associated figures and description:

An additive manufacturing apparatus comprising: a support configured to support a resin and a constituent material; a support plate including a window; a stage configured to hold one or more composite layers of the resin and the constituent material to form a composite component positioned opposite the support plate; a radiant energy device positioned on an opposite side of the support from the stage and operable to generate and project radiant energy in a patterned image through the window; and an actuator assembly configured to move the stage in a Z-axis direction and a Y-axis direction.

The additive manufacturing apparatus of one or more of these clauses, wherein the resin is laterally offset from the constituent material in the Y-axis direction.

The additive manufacturing apparatus of one or more of these clauses, wherein the constituent material is a short-fiber material.

The additive manufacturing apparatus of one or more of these clauses, wherein the constituent material is a powder containing carbon.

The additive manufacturing apparatus of one or more of these clauses, wherein the constituent material is a metallic powder.

The additive manufacturing apparatus of one or more of these clauses, wherein the constituent material is a ceramic powder.

The additive manufacturing apparatus of one or more of these clauses, further comprising: a depositor configured to deposit the resin and the constituent material on the support.

The additive manufacturing apparatus of one or more of these clauses, further comprising: a frame operably coupled with the stage, the radiant energy device, and the support plate, the frame further coupled with a mounting plate; and a first slide assembly, wherein the frame, the stage, the radiant energy device, and the support plate are moveable relative to the mounting plate along the first slide assembly.

The additive manufacturing apparatus of one or more of these clauses, wherein an actuator of the actuator assembly is operably coupled with the frame and the mounting plate, and wherein the actuator is configured to move the frame between a first position and a second position along the first slide assembly.

The additive manufacturing apparatus of one or more of these clauses, further comprising: a second slide assembly operably coupled with the radiant energy device and the frame, wherein the radiant energy device is movable relative to the frame along the second slide assembly.

The additive manufacturing apparatus of one or more of these clauses, further comprising: a third actuator operably coupled with the frame and the radiant energy device, wherein the third actuator is configured to move the radiant energy device between a first position and a second position along the second slide assembly.

A method of operating an additive manufacturing apparatus, the method comprising: depositing a layer of a resin and a constituent material onto a support; placing a stage in a first position such that a working surface contacts the resin; placing the stage in a second position to intersperse the constituent material with the resin; and curing a portion of the resin while the stage is in the second position.

The method of one or more of these clauses, wherein curing the portion of the resin while the stage is in the second position forms a first composite layer of a component.

The method of one or more of these clauses, further comprising: placing the stage in a third position such that the working surface contacts the resin, wherein the constituent material extends within the first composite layer of the component and the resin on the support.

The method of one or more of these clauses, further comprising: positioning a radiant energy device in a first projection position, wherein the portion of the first resin is cured while the radiant energy device is in the first projection position.

The method of one or more of these clauses, further comprising: positioning the radiant energy device in a second projection position, wherein the second projection curing position is offset from the first projection position in the Y-axis direction, and wherein the portion of the first resin is cured while the radiant energy device is in the second projection position.

An additive manufacturing apparatus comprising: a support configured to support a resin and a constituent material; a support plate including a window; a stage configured to hold first and second composite layers of the resin and the constituent material to form a composite component positioned opposite the support plate, the constituent material extending between the first and second composite layers; a radiant energy device positioned on an opposite side of the support from the stage and operable to generate and project radiant energy in a patterned image through the window; and an actuator assembly configured to move the stage in a Z-axis direction and a Y-axis direction.

The additive manufacturing apparatus of one or more of these clauses, further comprising: a first slide assembly operably coupled with the base plate of the frame and a mounting plate, the first slide assembly configured to guide movement of the frame relative to the mounting plate in a Y-axis direction.

The additive manufacturing apparatus of one or more of these clauses, further comprising: a second slide assembly positioned between the radiant energy device and the frame structure, the second slide assembly configured to guide movement of the radiant energy device relative to the window.

The additive manufacturing apparatus of one or more of these clauses, wherein the second slide assembly includes a rail operably coupled with the frame structure and one or more guides, the one or more guides slidable along the rail.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus comprising:
   a support configured to support a resin and a constituent material;
   a support plate including a window;
   a stage configured to hold one or more composite layers of the resin and the constituent material to form a composite component positioned opposite the support plate;
   a radiant energy device positioned on an opposite side of the support from the stage and operable to generate and project radiant energy in a patterned image through the window;
   an actuator assembly configured to move the stage in a Z-axis direction and a Y-axis direction;
   a frame operably coupled with the stage, the radiant energy device, and the support plate, the frame further coupled with a mounting plate; and
   a first slide assembly, wherein the frame, the stage, the radiant energy device, and the support plate are moveable relative to the mounting plate along the first slide assembly.

2. The additive manufacturing apparatus of claim 1, wherein the resin is laterally offset from the constituent material in the Y-axis direction on the support.

3. The additive manufacturing apparatus of claim 1, wherein the constituent material is a short-fiber material.

4. The additive manufacturing apparatus of claim 1, wherein the constituent material is a metallic powder.

5. The additive manufacturing apparatus of claim 1, wherein the constituent material is a ceramic powder.

6. The additive manufacturing apparatus of claim 1, further comprising:
   a depositor configured to deposit the resin and the constituent material on the support.

7. The additive manufacturing apparatus of claim 1, wherein an actuator of the actuator assembly is operably coupled with the frame and the mounting plate, and wherein the actuator is configured to move the frame between a first position and a second position along the first slide assembly.

8. An additive manufacturing apparatus comprising:
   a support configured to support a resin and a constituent material;
   a support plate including a window;
   a stage configured to hold one or more composite layers of the resin and the constituent material to form a composite component positioned opposite the support plate;
   a radiant energy device positioned on an opposite side of the support from the stage and operable to generate and project radiant energy in a patterned image through the window;
   an actuator assembly configured to move the stage in a Z-axis direction and a Y-axis direction;
   a frame operably coupled with the stage, the radiant energy device, and the support plate, the frame further coupled with a mounting plate;
   a first slide assembly, wherein the frame, the stage, the radiant energy device, and the support plate are moveable relative to the mounting plate along the first slide assembly; and
   a second slide assembly operably coupled with the radiant energy device and the frame, wherein the radiant energy device is movable relative to the frame along the second slide assembly.

9. The additive manufacturing apparatus of claim 8, further comprising:
   a second slide assembly actuator operably coupled with the frame and the radiant energy device, wherein the second slide assembly actuator is configured to move the radiant energy device between a first position and a second position along the second slide assembly.

10. An additive manufacturing apparatus comprising:
    a support plate including a window;
    a stage configured to hold a composite component positioned opposite the support plate;
    a radiant energy device operable to generate and project radiant energy in a patterned image through the window;
    a frame operably coupled with the stage, the radiant energy device, and the support plate, the frame further coupled with a mounting plate; and
    a first slide assembly, wherein the frame, the stage, the radiant energy device, and the support plate are moveable relative to the mounting plate along the first slide assembly.

11. The additive manufacturing apparatus of claim 10, further comprising a support configured to support a resin and a constituent material, wherein the resin is laterally offset from the constituent material in a Y-axis direction on the support.

12. The additive manufacturing apparatus of claim 11, wherein the constituent material is a short-fiber material.

13. The additive manufacturing apparatus of claim 11, further comprising:
    a depositor configured to deposit the resin and the constituent material on the support.

14. The additive manufacturing apparatus of claim 11, further comprising:
    an actuator assembly configured to move the stage in a Z-axis direction and a Y-axis direction, wherein an actuator of the actuator assembly is operably coupled with the frame and the mounting plate, and wherein the actuator is configured to move the frame between a first position and a second position along the first slide assembly.

15. The additive manufacturing apparatus of claim 10, further comprising:
a second slide assembly operably coupled with the radiant energy device and the frame, wherein the radiant energy device is movable relative to the frame along the second slide assembly.

\* \* \* \* \*